(12) United States Patent
Piscopo

(10) Patent No.: US 10,046,490 B2
(45) Date of Patent: Aug. 14, 2018

(54) SNAP-OVER SPOUT FITMENT AND MANUFACTURE METHODS

(71) Applicant: Plastek Industries, Inc., Erie, PA (US)

(72) Inventor: Peter A. Piscopo, Medford, NJ (US)

(73) Assignee: Plastek Industries, Inc., Erie, PA (US)

( * ) Notice: Subject to any disclaimer, the term of this patent is extended or adjusted under 35 U.S.C. 154(b) by 75 days.

(21) Appl. No.: 15/206,807

(22) Filed: Jul. 11, 2016

(65) Prior Publication Data

US 2016/0318670 A1    Nov. 3, 2016

Related U.S. Application Data

(63) Continuation-in-part of application No. PCT/US2015/025892, filed on Apr. 15, 2015.

(Continued)

(51) Int. Cl.
| | | |
|---|---|---|
| B65D 47/00 | (2006.01) | |
| B29C 45/00 | (2006.01) | |
| B65D 25/42 | (2006.01) | |
| B65D 41/26 | (2006.01) | |
| B65D 1/02 | (2006.01) | |
| B65D 41/34 | (2006.01) | |
| B65D 47/12 | (2006.01) | |

(Continued)

(52) U.S. Cl.
CPC .......... *B29C 45/0081* (2013.01); *B65D 1/023* (2013.01); *B65D 1/0246* (2013.01); *B65D 25/42* (2013.01); *B65D 41/26* (2013.01); *B65D 41/3423* (2013.01); *B65D 47/122* (2013.01); *B29C 45/0055* (2013.01); *B29C 2045/0056* (2013.01); *B29L 2001/00* (2013.01); *B29L 2031/565* (2013.01)

(58) Field of Classification Search
CPC ...... B29C 45/008; B65D 1/023; B65D 23/10; B65D 25/42; B65D 41/04; B65D 47/06
USPC .......................................................... 222/545
See application file for complete search history.

(56) References Cited

U.S. PATENT DOCUMENTS 2,267,755 A * 12/1941 Schroeder ............ B65D 39/084
  220/304
3,860,152 A *  1/1975 Marti ..................... B65D 25/42
  215/224

(Continued)

FOREIGN PATENT DOCUMENTS

| JP | 2013-252885 A | 12/2013 |
|---|---|---|
| WO | 2014/071154 A1 | 5/2014 |
| WO | 2015/160898 A1 | 10/2015 |

OTHER PUBLICATIONS

International Search Report and Written Opinion for PCT/US2015/025892, dated Jul. 13, 2015.

*Primary Examiner* — Patrick M Buechner
*Assistant Examiner* — Michael J Melaragno
(74) *Attorney, Agent, or Firm* — Bachman & LaPointe, P.C.

(57) ABSTRACT

A container comprises: a body having a neck extending to a mouth defining a body opening; a spout fitment having a spout within the body opening, an outer wall surrounding an upper portion of the neck, and an intermediate wall between the outer wall and the spout; and a cap having sidewall. An external thread of the cap sidewall is engaged to an internal thread of the intermediate wall. The spout fitment has one or more projections extending mouthward from the outer wall in backlocked engagement with one or more features of the neck.

19 Claims, 24 Drawing Sheets

Related U.S. Application Data

(60) Provisional application No. 61/981,014, filed on Apr. 17, 2014, provisional application No. 62/082,191, filed on Nov. 20, 2014, provisional application No. 62/191,371, filed on Jul. 11, 2015.

(51) Int. Cl.
*B29L 1/00* (2006.01)
*B29L 31/56* (2006.01)

(56) References Cited

U.S. PATENT DOCUMENTS

| | | | | |
|---|---|---|---|---|
| 4,300,701 | A * | 11/1981 | Santostasi | B65D 41/04 215/318 |
| 4,830,234 | A * | 5/1989 | Odet | B65D 47/12 222/109 |
| 4,993,605 | A * | 2/1991 | Del'Re | B65D 41/26 222/109 |
| 5,431,306 | A * | 7/1995 | Reid | B65D 47/06 222/109 |
| 5,566,862 | A | 10/1996 | Haffner et al. | |
| 5,603,787 | A | 2/1997 | Reid | |
| 5,941,422 | A | 8/1999 | Struble | |
| 6,279,789 | B1 * | 8/2001 | Krall | B65D 41/20 220/254.1 |
| 6,923,341 | B2 | 8/2005 | Smith | |
| 6,964,359 | B1 * | 11/2005 | Darr | B65D 47/06 222/570 |
| 2006/0131330 | A1 * | 6/2006 | Stebick | B65D 47/122 222/109 |
| 2009/0101682 | A1 | 4/2009 | Szekely et al. | |
| 2010/0043910 | A1 * | 2/2010 | Szekely | B65D 47/06 141/1 |
| 2011/0011494 | A1 * | 1/2011 | Muhlhausen | B65D 47/06 141/331 |
| 2011/0204099 | A1 | 8/2011 | Piscopo et al. | |
| 2013/0248479 | A1 * | 9/2013 | Hindle | B65D 39/00 215/43 |
| 2013/0327795 | A1 | 12/2013 | Krammer | |
| 2016/0311582 | A1 * | 10/2016 | FitzSimons | B65D 41/22 |

\* cited by examiner

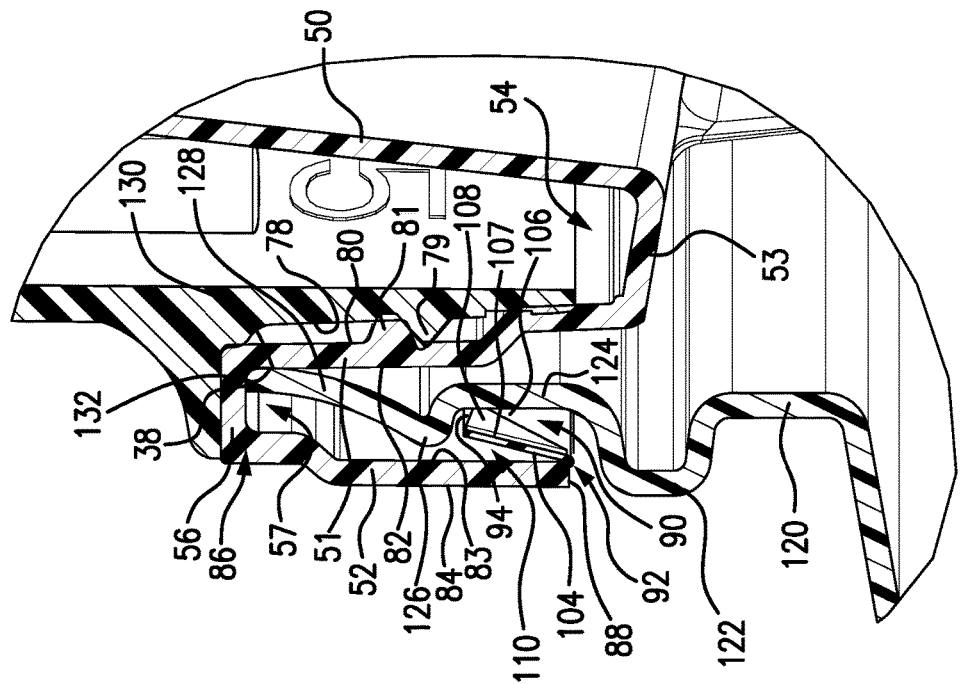
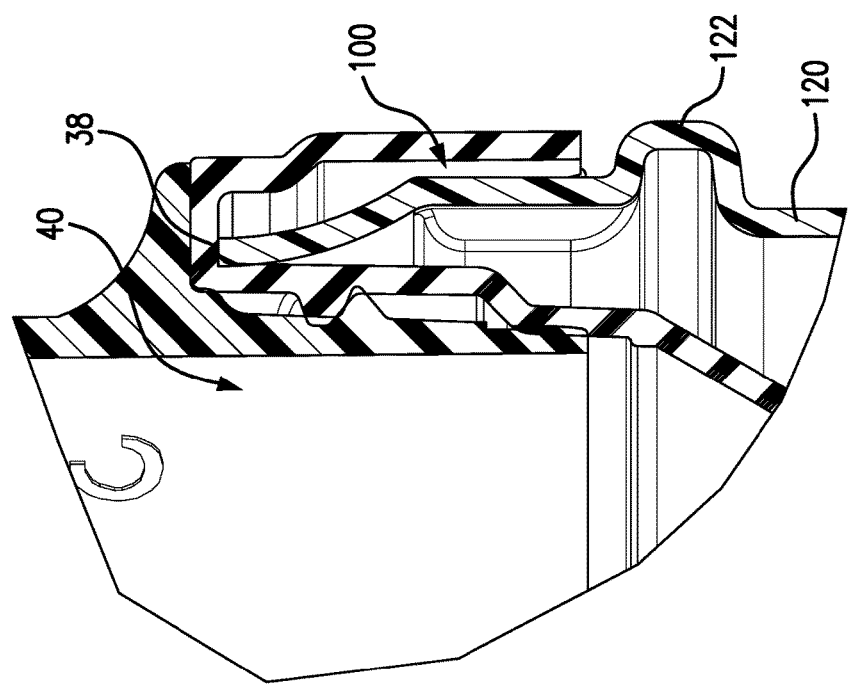
FIG. 4B
FIG. 4A

SNAP-OVER SPOUT FITMENT AND MANUFACTURE METHODS

CROSS-REFERENCE TO RELATED APPLICATIONS

Benefit is claimed of U.S. Patent Application No. 62/191,371, filed Jul. 11, 2015, and entitled "Snap-Over Spout Fitment and Manufacture Methods", the disclosure of which is incorporated by reference herein in its entirety as if set forth at length and this is a Continuation-In-Part of International Application No. PCT/US2015/25892, filed Apr. 15, 2015 and entitled "Snap-Over Spout Fitment and Manufacture Methods" which claims benefit of both U.S. Patent Application No. 61/981,014, filed Apr. 17, 2014, and entitled "Snap-Over Spout Fitment and Manufacture Methods" and U.S. Patent Application No. 62/082,191, filed Nov. 20, 2014, and entitled "Snap-Over Spout Fitment and Manufacture Methods", the disclosures of which international application and provisional applications are incorporated by reference herein in their entireties as if set forth at length.

BACKGROUND OF THE INVENTION

The invention relates to containers. More particularly, the invention relates to pour spouts for containers for liquid laundry detergent and the like.

There has been an evolution in the configuration of containers for liquid laundry detergent, fabric softener, and the like. The dominant form of container is a wide mouth bottle having an attached spout with a drain-back trough and aperture (often identified as a drain back spout (DBS) configuration). In a typical group of container configurations and their methods of assembly, a bottle body, spout fitment, and cap are individually molded (e.g., of high density polyethylene (HDPE) for the body, polypropylene for the cap, and low density polypropylene (LDPE) for the spout fitment). Exemplary bottle body molding is via blow molding whereas exemplary spout fitment and cap molding are by injection molding. An exemplary spout fitment includes the spout and a continuation of the spout defining the base and outboard wall of the trough. The fitment further typically includes a flange (e.g., extending outward at an upper end of the outboard extremity of the outboard wall).

The spout fitment may be inserted through a mouth of the bottle body (e.g., so that an outer surface of the outboard trough wall, or another wall outboard thereof, engages the inner surface of the bottle neck). The spout fitment may be secured and sealed to the bottle body such as by spin welding. The bottle may be filled and the cap may be installed. Exemplary caps typically have either an externally threaded skirt for engaging an internally threaded portion of the fitment or an internally threaded skirt for engaging an externally threaded portion of the fitment or bottle body neck. With a typical externally threaded skirt, the cap includes an outwardly projecting flange above the skirt. Upon installation of the cap to the fitment, the flange underside contacts and seals with the fitment flange upper surface to seal the bottle.

Various examples of bottles are shown in U.S. Pat. Nos. 6,923,341, 5,941,422, 5,566,862, and 5,603,787. US Patent Publications 2010/0043910 and 2009/0101682 disclose particular examples of snap-in and snap-over spout fitments.

International Application PCT/US13/68002 discloses additional bottle filling methods.

SUMMARY OF THE INVENTION

One aspect of the invention involves a container comprising a body having a neck extending to a mouth defining a body opening. A spout fitment has: a spout within the body opening; an outer wall surrounding an upper portion of the neck; and an intermediate wall between the outer wall and the spout. A cap has sidewall, an external thread of the cap sidewall engaged to an internal thread of the intermediate wall. The spout fitment has one or more projections extending mouthward from the outer wall in backlocked engagement with one or more features of the neck.

A further embodiment may additionally and/or alternatively include a gap in the one or more projections receiving a lug of the body to angularly register the spout fitment.

A further embodiment may additionally and/or alternatively include the one or more features being a single full annulus feature.

A further embodiment may additionally and/or alternatively include the one or more features being a protrusion from an outer surface of the neck having an associated recess in an inner surface of the neck.

A further embodiment may additionally and/or alternatively include the one or more projections having a proximally tapering thickness from a distal end to a root end.

A further embodiment may additionally and/or alternatively include the one or more projections being a plurality of projections in a circumferential array.

A further embodiment may additionally and/or alternatively include an inboard surface of the outer wall having a plurality of recesses, each respectively aligned with an associated one of the projections.

A further embodiment may additionally and/or alternatively include the one or more projections having, adjacent a gap, a pair of reinforcing ribs protruding radially inward.

A further embodiment may additionally and/or alternatively include the one or more projections being joined by respective webs.

A further embodiment may additionally and/or alternatively include the plurality of projections having a plurality of alternatingly interspersed gaps.

A further embodiment may additionally and/or alternatively include the one or more projections being a single projection formed as an annulus with a single gap.

A further embodiment may additionally and/or alternatively include means on the body and fitment for preventing relative rotation of the body and fitment about a central longitudinal axis of the opening.

A further embodiment may additionally and/or alternatively include the fitment comprising a trough between the intermediate wall and spout with at least one drain aperture.

A further embodiment may additionally and/or alternatively include the body consisting essentially of HDPE; the spout fitment consisting essentially of polypropylene; and the cap consisting essentially of polypropylene.

A further embodiment may additionally and/or alternatively include the body having an integrally molded handle; and an interior compartment of the body extends through the handle.

A further embodiment may additionally and/or alternatively include the fitment being neither adhered nor welded to the body.

A further embodiment may additionally and/or alternatively include the fitment being not threadingly engaged to the body.

A further embodiment may additionally and/or alternatively include a cap sealing surface being along an underside of a flange of the cap.

A further embodiment may additionally and/or alternatively include 1.0-6.0 liters of a liquid within the body.

A further embodiment may additionally and/or alternatively include at least 1.0 liter of liquid detergent or fabric softener within the body.

A further embodiment may additionally and/or alternatively include the body being a blow molded body.

Another aspect of the disclosure involves a method comprising: molding a spout fitment. The spout fitment has: a spout having an outlet; an intermediate wall outboard of the spout and cooperating with the spout to form a trough; an outer wall; a web joining the outer wall to the intermediate wall and cooperating with the intermediate wall and outer wall to define a channel; and at least one projection extending from the outer wall in a direction away from the web. The at least one projection is shifted to extend in a direction toward the web.

A further embodiment may additionally and/or alternatively include, after the shifting, the at least one projection relaxing into contact with an outer surface of the intermediate wall.

A further embodiment may additionally and/or alternatively include the shifting comprising a rotation by at least 45° and the rotation involving a toggle action.

A further embodiment may additionally and/or alternatively include: inserting the spout fitment into a neck portion of a container body, the inserting comprising a resilient deformation of the at least one projection followed by an at least partial relaxation so as to engage a locking surface of the at least one projection to a locking surface of the container body to resist a reverse extraction; and threading a cap onto at least one of the spout fitment and container body.

A further embodiment may additionally and/or alternatively include the threading being at least partially before the inserting.

A further embodiment may additionally and/or alternatively include the inserting consisting essentially of a linear insertion.

A further embodiment may additionally and/or alternatively include delivering at least 1.0 liter of a liquid into the container body.

A further embodiment may additionally and/or alternatively include the delivering being before the inserting.

A further embodiment may additionally and/or alternatively include there being no welding or adhesive bonding of the spout fitment to the container body before the delivering.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4A is an enlarged view of a rear portion of a rim area.
FIG. 4B is an enlarged view of a front portion of the rim area.

The drawings reflect artifacts of computer modeling such as showing interference as overlap (whereas actual hardware would experience deformation).

Like reference numbers and designations in the various drawings indicate like elements.

DETAILED DESCRIPTION

Figure 1:
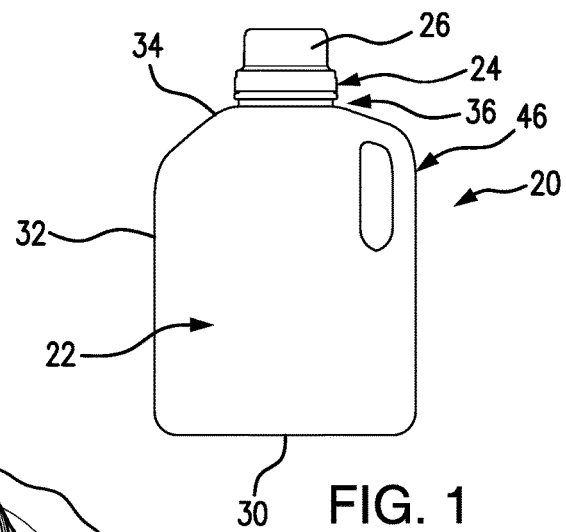
FIG. 1 is a side view of a bottle.
Figure 2:
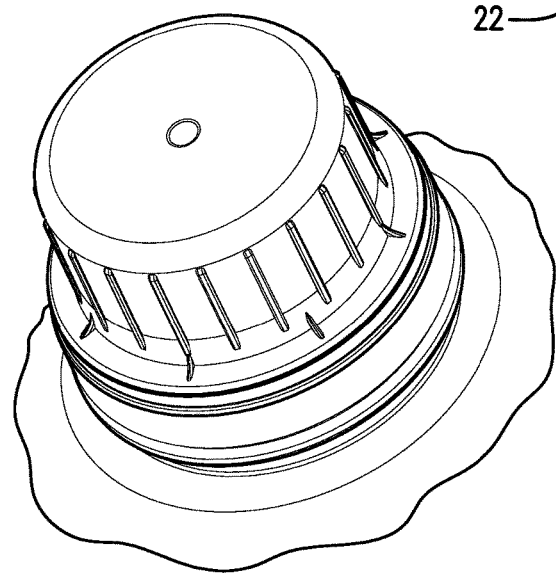
FIG. 2 is a view of an upper portion of the bottle of FIG. 1.

FIG. 1 shows a container 20 comprising the assembly of a bottle body 22, a spout fitment 24, and a cap 26 (which may serve as a measuring/dispensing cup). Each may be made as a unitary plastic molding. Exemplary bottle body material is high density polyethylene (HDPE). Exemplary spout fitment and cap material is polypropylene.

Figure 3:
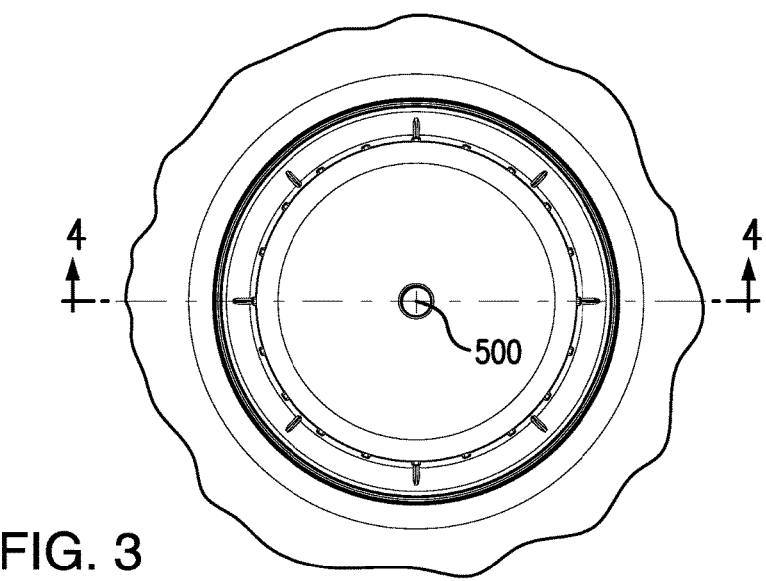
FIG. 3 is a top view of the portion of FIG. 2.
Figure 4:
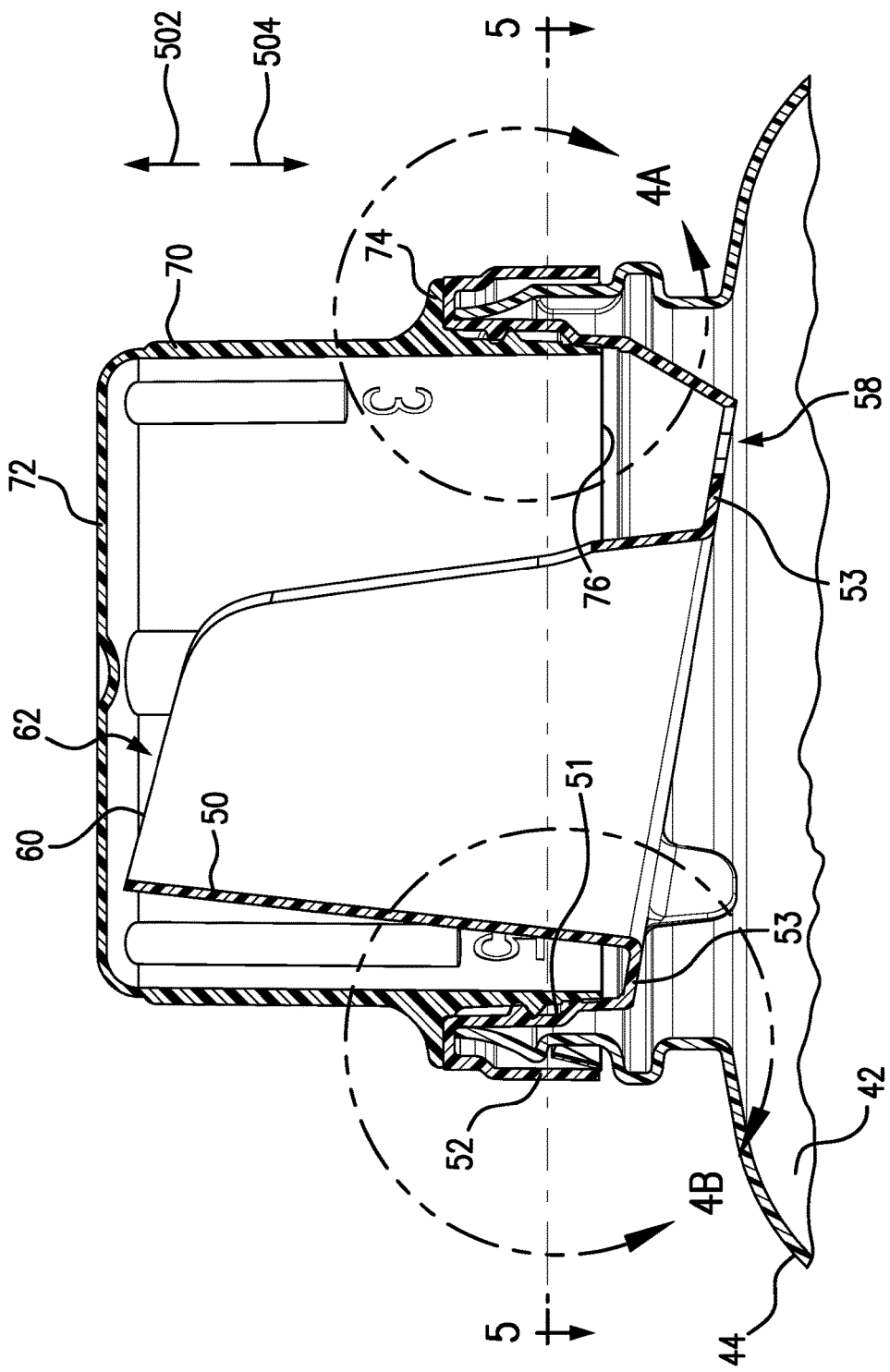
FIG. 4 is a central vertical medial sectional view of the portion of FIG. 3, taken along line 4-4.

The body 22 comprises a unitary combination of a base 30, a sidewall 32 extending upward from the base, a shoulder 34 at an upper end of the sidewall, and a neck 36 extending upward from the shoulder to a rim 38 (FIG. 4A) and defining an opening 40 having a central longitudinal axis 500. In this example, an axis 500 (FIG. 3) serves as a central longitudinal axis of the spout fitment, cap, and neck of the bottle. In this exemplary embodiment, the axis 500 is vertical when the bottle is resting atop a horizontal surface. Other orientations may be possible. With this exemplary frame of reference, the bottle in the upright condition, a direction 502 (FIG. 4) is upward parallel to the axis 500 and in opposite direction 504 is downward. Unless otherwise indicated, this frame of reference is used to explain relative position. Clearly, the bottle will be at least partially inverted to pour.

The bottle body has an interior surface 42 and an exterior surface 44. A handle 46 (FIG. 1) may extend from the sidewall and the body interior may extend through the handle The spout fitment 24 includes an inner wall 50 (FIG. 4B), an intermediate sidewall 51, and an outer sidewall 52. The intermediate sidewall and inner wall are joined by a lower wall 53 so as to define a trough 54. The intermediate sidewall and outer sidewall are joined by an annular web 56 to define a downwardly-open channel 57.

One or more drain-back apertures 58 (FIG. 4) are open to the trough 54 (e.g., through the wall 53). The inner wall 50 forms a spout and has an upper end 60 defining a spout opening 62. The upper end 60 peaks along a forward portion and dips along a rearward portion so that the opening 62 is asymmetric and defines a preferential direction for pouring.

The cap 26 includes a sidewall 70, a transverse web 72 at the upper end of the sidewall, and an outwardly projecting flange 74 spaced a short distance above a lower end (rim) 76 of the sidewall. An outer surface 78 (FIG. 4B) of the sidewall 70 bears an external thread 79.

FIG. 4B shows the spout fitment intermediate sidewall 51 as having an inboard surface 80 bearing an internal thread 81. The intermediate sidewall 51 has an external/outboard surface 82. The outer sidewall 52 has an inboard surface 83, an outboard surface 84, upper end 86 (at a junction with the web 56) and a lower end or rim 88. A circumferential array of tabs 90 is formed along the outer sidewall extending upward. Each tab 90 has a proximal junction/hinge 92 with the remainder of the sidewall and an upper/distal end surface 94. As is discussed in further detail below, the surface 94 engages an adjacent surface of the bottle body to retain the spout fitment in an installed condition.

Figure 5A:
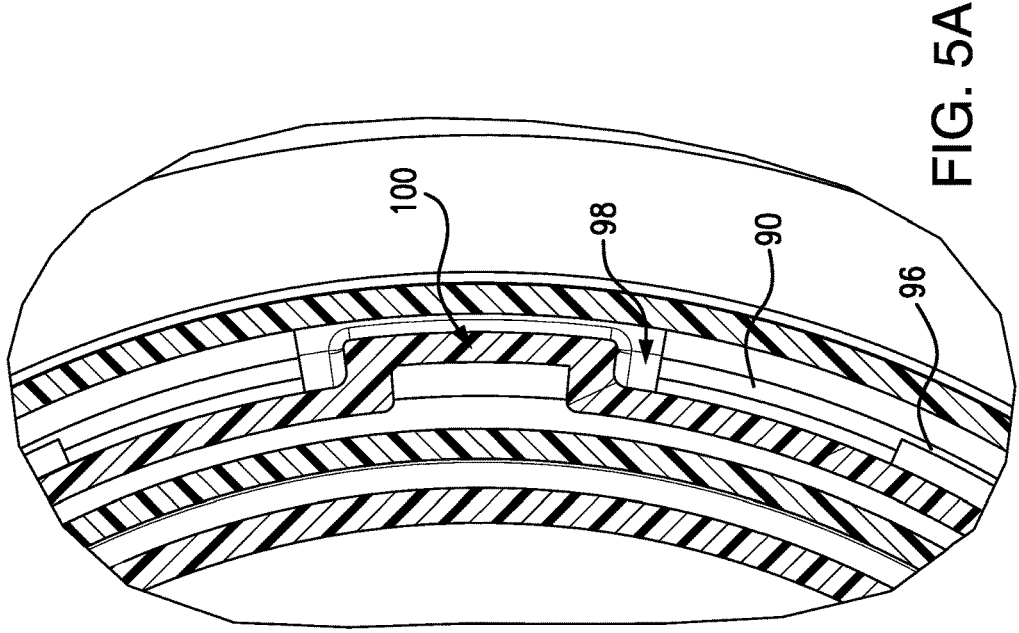
FIG. 5A is an enlarged view of a portion of the bottle portion of FIG. 5.

FIG. 5A shows the exemplary tabs 90 as being separated by reduced thickness webs 96. In the exemplary embodiment, the webs 96 are full-height so that the distal end surface 94 forms a continuous generally annular surface along the tabs 90 and the webs 96. Other configurations are discussed further below.

Figure 5:
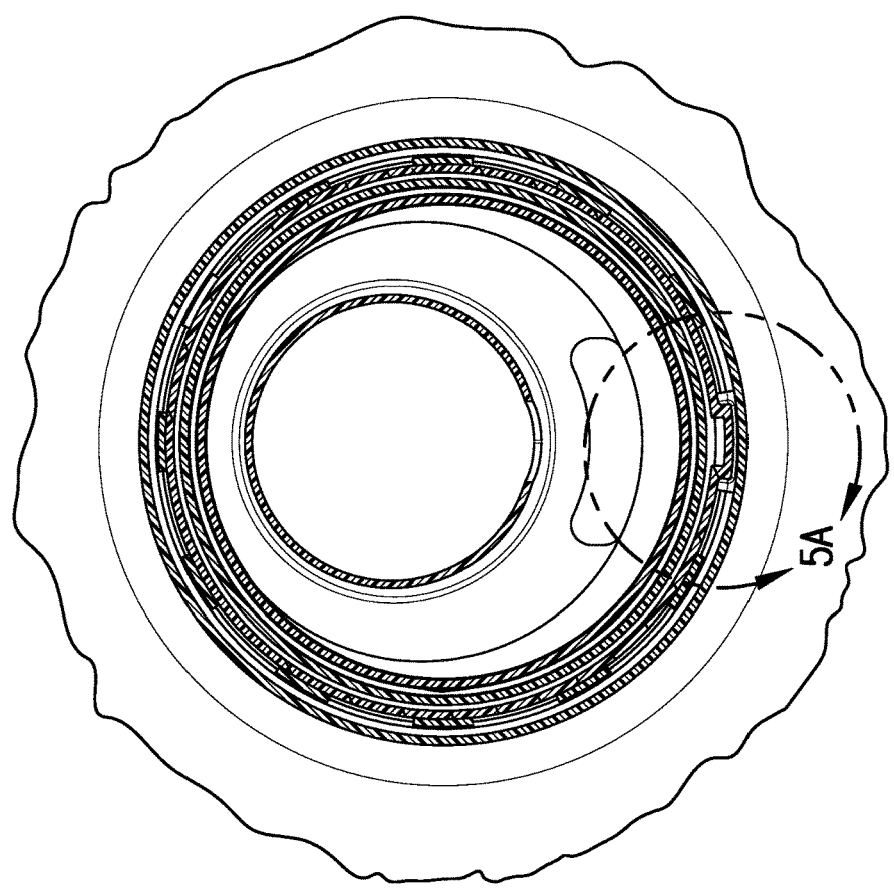
FIG. 5 is a downward horizontal sectional view of the bottle portion of FIG. 4, taken along line 5-5.
Figure 6:
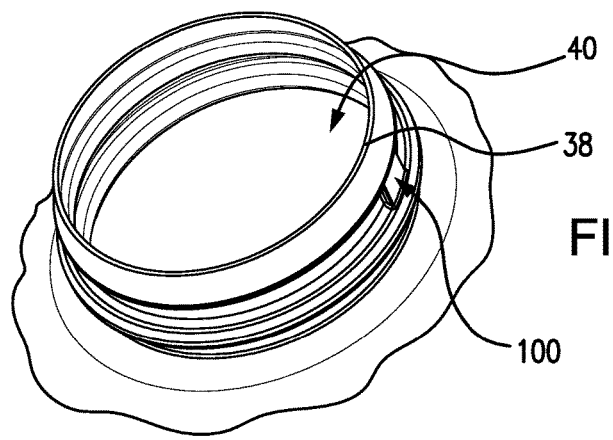
FIG. 6 is a view of the bottle body of the bottle portion of FIG. 2.

FIG. 5 shows an exemplary group of twelve tabs. For this exemplary embodiment, an exemplary number of tabs is 2-36, more narrowly, 8-16. The exemplary tabs are of slightly larger circumferential span than the associated webs alternating in between. In the exemplary embodiment, there is a gap 98 (FIG. 5A) between two of the tabs. In this embodiment, the gap 98 is of slightly larger angular/circumferential span (about the axis 500) than the webs 96 and the immediately adjacent pair of tabs 90 are of slightly lesser circumferential extent than the remaining tabs. The gap 98 receives a lug 100 of the bottle body neck. The circumferential sides of the lug 100 face corresponding circumferential ends of the terminal tabs 90 so as to angularly orient the spout fitment within the bottle body so that the spout's preferential pour direction is always as desired relative to the bottle body (e.g., away from the handle).

FIG. 4B shows opposite surfaces of the tabs 90 and webs 96 extending between the junction/hinge 92 and the distal end surface 94. Along one or both of these two surfaces, the web 96 surface may be recessed relative to the tab surface so as to allow the web to be thinner than the tab. In the particular illustrated example, a first surface 104 is shared/aligned along both the tabs and webs while a second surface 106, 107, 108 is recessed along the webs relative to the tabs. Thus, the portion along the webs is designated 107 and the portion along the tabs is designated 106 with sides 108 of the tabs joining the two. As is discussed further below, the tabs are shown protruding upward from the junctions/hinges 92 but are molded in a condition protruding generally downward. After molding, the tabs and webs are partially inverted. After inversion, the tabs and webs define a partial channel 110 between the surface 104 and the inboard surface 83 of the outer sidewall 52.

An exemplary tab thickness increase between the junction/hinge 92 and the distal end surface 94 (or a location distal of the hinge but not at the end) may be at least 30%, more particularly, at least 50% or an exemplary at least 100% (e.g., 200% to 10,000% or 200% to 1000%). An exemplary height of the tab (e.g., measured either parallel to the axis 500 or along the surface 104) may be at least 0.2 cm (e.g., more narrowly, 0.4 cm-2.0 cm). An exemplary thickness at the end 94 (or other peak thickness) is 0.060 inch (1.5 mm), more broadly 0.5-2.0 mm. Exemplary hinge thickness is up to 0.40 mm, more particularly up to 0.30 mm, or 0.05-0.40 mm with an exemplary 0.15-0.30 mm.

Returning to FIGS. 4A and 4B, the neck has, from bottom-to-top, a lower generally tubular/cylindrical portion 120, a radially outwardly projecting flange 122 thereabove, and an intermediate portion 124 continuing upward from the flange 122. The flange 122 is a lower flange used for retaining the bottle during filling and capping as is known in the art. For example, during filling and capping, a fixture may receive the neck lower portion 120 with an upper face of the fixture supporting the underside of the flange 122. A second flange 126 is formed at an upper end of the intermediate portion 124.

FIG. 4A shows the exemplary lug 100 as being essentially radially flush to the upper flange 126 at the upper end of the intermediate portion 124 and still slightly recessed from the outer diameter (OD) periphery of the lower flange 122. In cross-section, an arcuate upper portion 128 transitions upward from the flange 126 to the rim 38 and, along its interior, is vertically convex. This convexity helps provide a smooth transition on insertion of the fitment and provides close fitting abutting surfaces 130, 132 along the upper portion 128 and the intermediate wall outer surface 82, respectively. In the fully installed condition, the rim 38 is seated against the underside of the web or flange 56. In the fully installed condition, the distal end surfaces 94 of the tabs are contacting or in close-facing relation to an underside of the upper flange 126 so that attempted extraction of the fitment will be resisted by the backlocking engagement between the end surface 94 and the upper flange 126 underside.

Figure 7:
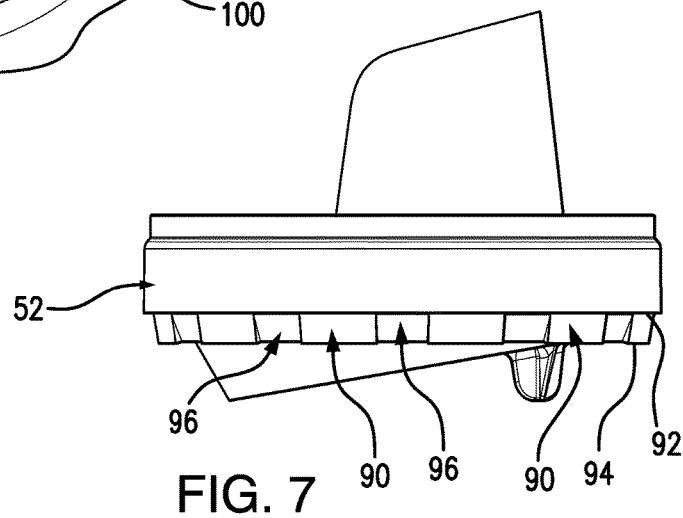
FIG. 7 is an as-molded side view of a spout fitment of the bottle of FIG. 1.
Figure 8:
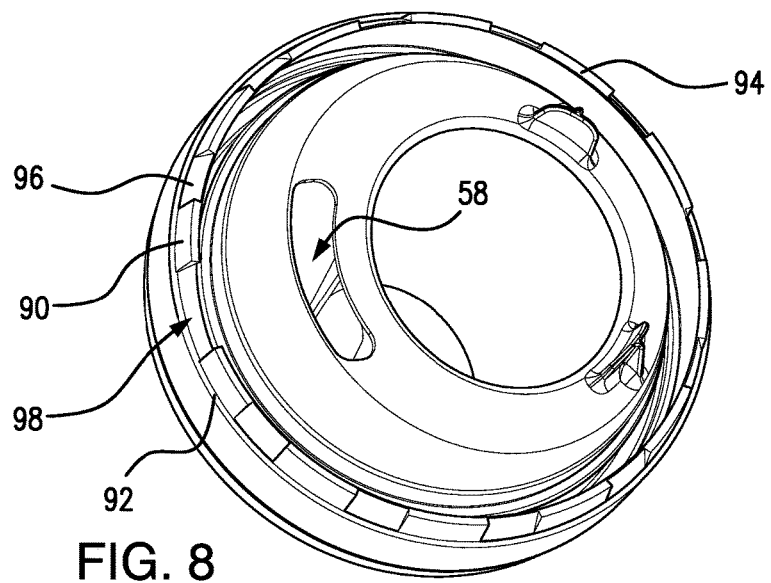
FIG. 8 is a bottom perspective view of the spout fitment of FIG. 7.

In an exemplary method of manufacture, the tabs 90 and webs 96 are initially molded extending downward from the fitment outer/outboard sidewall 52 (FIGS. 7 and 8). The tabs may be bent upward for assembly. Exemplary bending rotates the tabs by at least 45°, more particularly, at least 90°. The relative thinness of the webs 96 helps facilitate this partial inverting of the tabs allowing greater flexing along the webs. However, once inverted, the webs help prevent relaxation back toward the as-molded condition by creating an over-center toggle mechanism. A detailed process and associated tooling is discussed below after discussing additional embodiments of fitment. After this inversion, the spout fitment may be inserted into the bottle neck such as is discussed immediately below.

In an exemplary method of assembly, the cap is fully or partially screwed onto the spout fitment. The spout fitment is then inserted into the bottle neck. During insertion engagement of inboard surfaces 106 of the tabs 90 with the bottle outboard surface along the neck flexes the tabs outward (e.g., compressing the gap between the tab and the outboard sidewall 52 and/or flexing the outboard sidewall 52).

Eventually, the tabs 90 pass over the flange 126 and relax into the locking engagement described above. Dimensions may be such that interference contact between the surfaces 130 and 132 provides a sealing under normal loads associated with pouring.

In one exemplary installation operation, the cap is fully or partially screwed on to the spout fitment prior to insertion of the spout fitment. If the bottle was not filled prior to insertion, the cap may thereafter be unscrewed and removed so that the bottle may then be filled. The cap may be further tightened (screwed back on) if needed.

Figure 9:
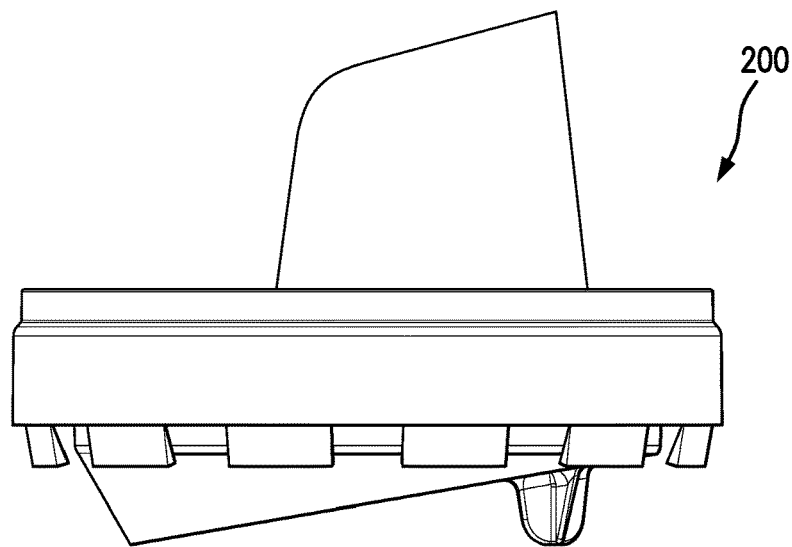
FIG. 9 is an as-molded side view of a second spout fitment.
Figure 10:
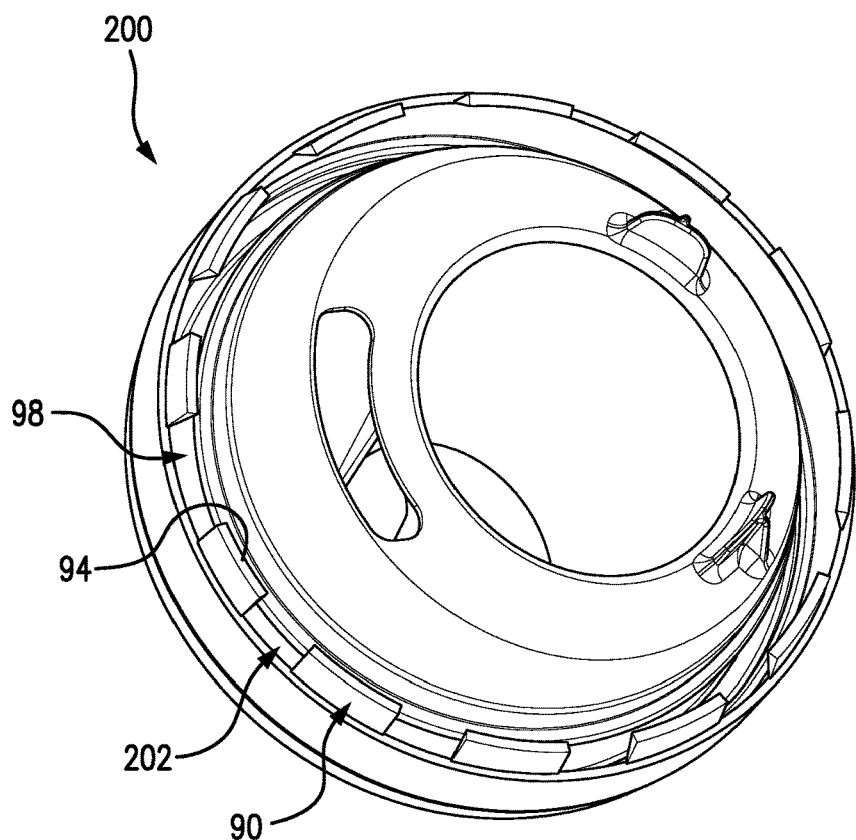
FIG. 10 is a bottom perspective view of the second spout fitment.

In one further embodiment of FIGS. 9 and 10, the spout fitment 200 may be otherwise similar to the spout fitment 24 described above. However, the webs 96 are gone, replaced by gaps 202. The exemplary gaps 202 are essentially full height of the tabs 90. Yet alternative embodiments may involve partial height webs. The exemplary gaps 202 are smaller (of smaller circumferential/angular span) than the gap 98 or, more particularly, the lug 100. This maintains the role of the gap 98 in uniquely receiving the lug to angularly register the spout fitment in the desired condition.

Figure 11:
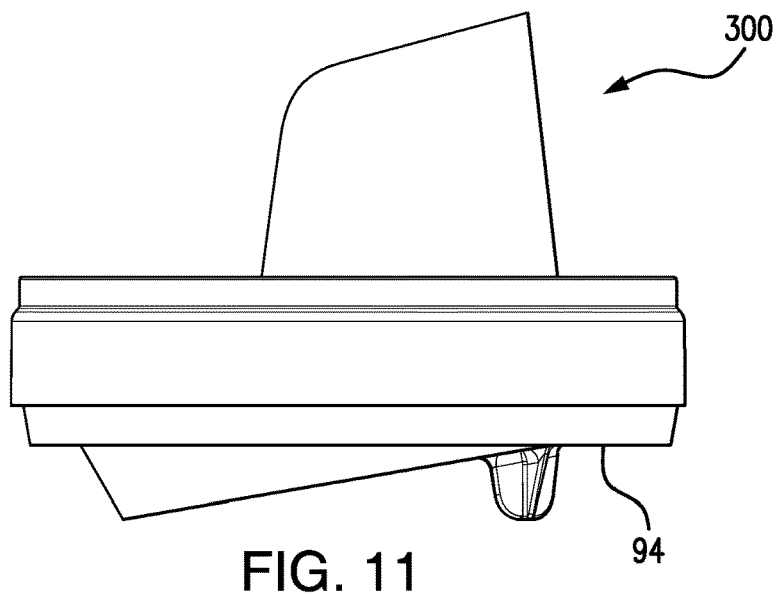
FIG. 11 is an as-molded side view of a third spout fitment.
Figure 12:
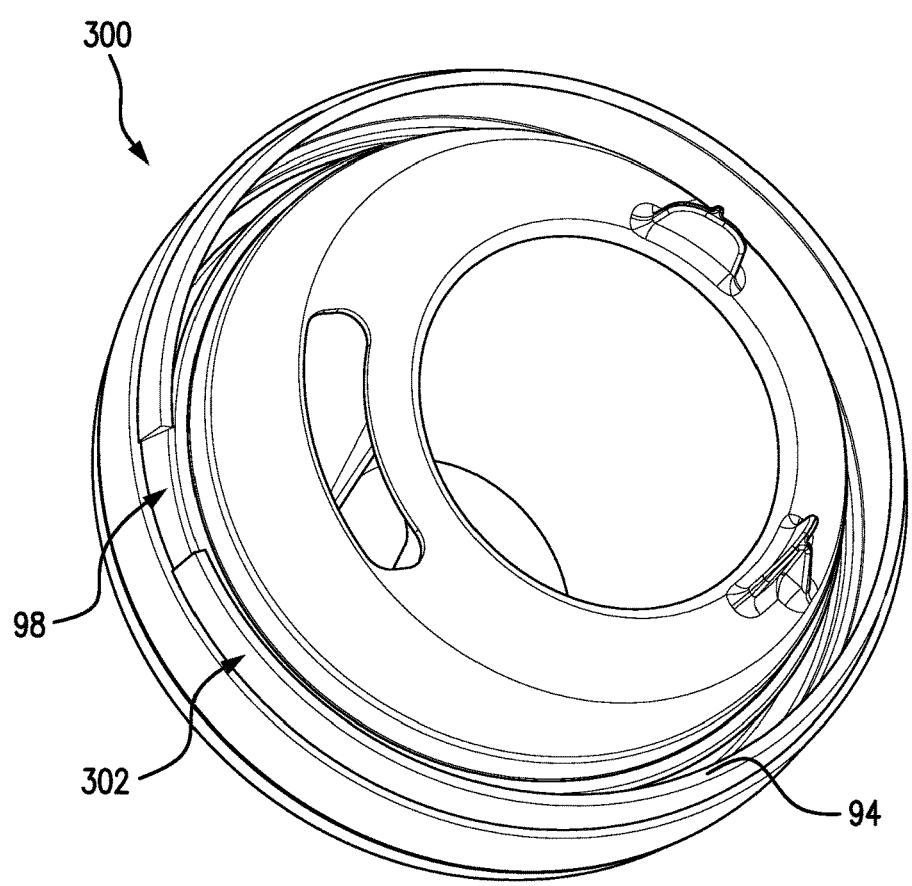
FIG. 12 is a bottom perspective view of the third spout fitment.

Yet a further variation is shown in FIGS. 11 and 12 wherein the spout fitment 300 has a single projection or tab 302 replacing the tabs 90 and webs 96 of the spout fitment 24. The exemplary gap 98, however, remains between opposite ends of the projection 302. Manufacture may be otherwise the same as the other embodiments. However, a greater force may be required to invert the projection from the as-molded condition.

Figure 13:
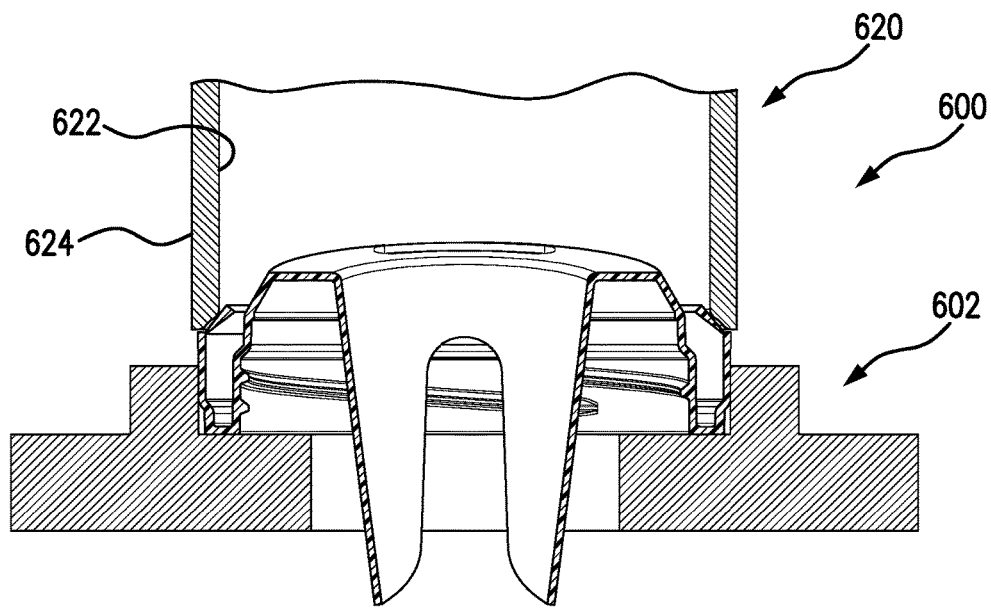
FIG. 13 is a partial central vertical sectional view of a spout fitment in a first stage of projection deformation.
Figure 13A:
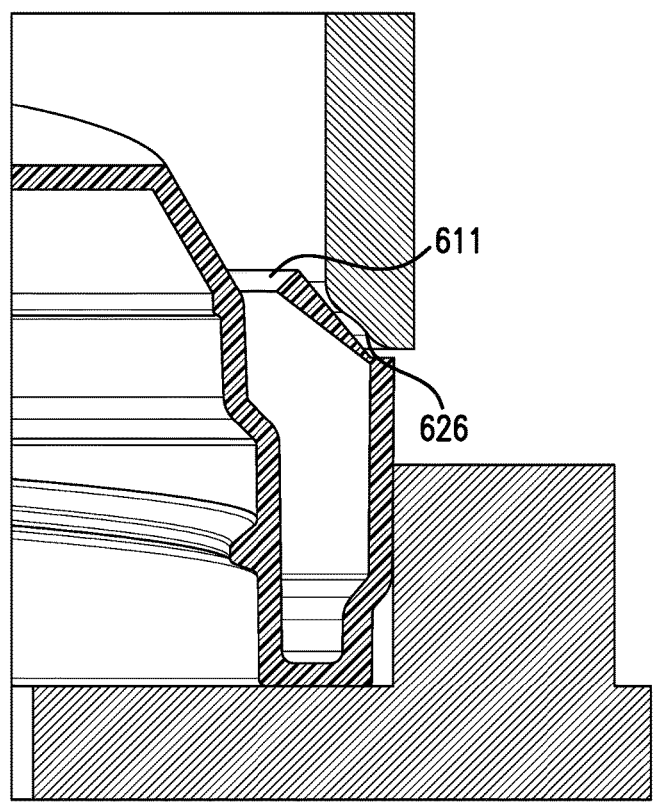
FIG. 13A is an enlarged view of the view of FIG. 13.

An exemplary partial inverting of the projections from the as-molded condition comprises placing the spout fitment inverted in a fixture 600 (FIG. 13). As is discussed below, one exemplary fixture involves a station along a flowpath of the spout fitments. In one example, the fixture comprises a generally circular outer track 602 and an inner turret. In the exemplary embodiment, the track and turret may be shown cutaway at respective left and right sides (or vice-versa) in FIG. 13. The exemplary track comprises two segments of a circle with gaps between segments creating infeed and outfeed locations. The turret rotates around its central vertical axis driving the fitments along the flowpath from the infeed to the outfeed. Mandrels or other features on the turret may engage the fitments to guide/drive their movement along the flowpath. The exemplary fixture captures the fitment outboard wall with the projection(s) pointing upward. Then, a collar-like tool 620 is brought down to engage the projection(s). In the exemplary embodiment, the tool may be carried by the turret to rotate therewith. The tool has an inner diameter (ID) surface 622 and an outer diameter (OD) surface 624. A lower rim portion 626 of the tool is dimensioned to engage the outboard surface of the projection(s) and, as the tool is brought down, deflect the projection(s) radially inward. A final stage of this deflection brings the end(s) 94 of the projection(s) inboard of the tool ID surface, thereby exposing the end(s) for further engagement by further tooling. In this example, this stage rotates the cross-section of the projection(s) by a relatively small amount (e.g., less than 90° or less than 60° or even less than 45°) so as to not yet go over-center.

Figure 14:
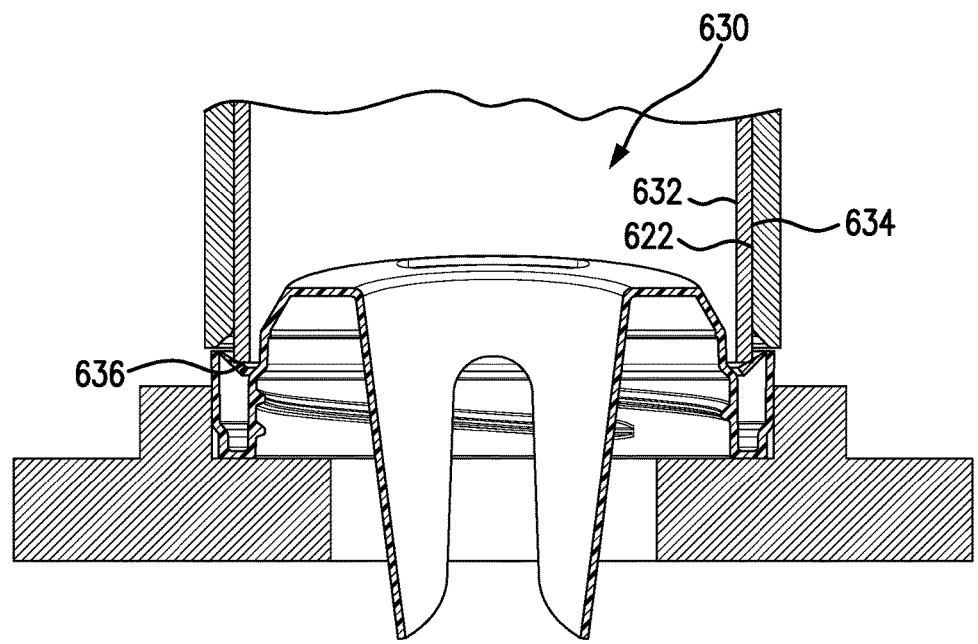
FIG. 14 is a partial central vertical sectional view of the spout fitment in a second stage of projection deformation.

FIG. 14 shows the second tool 630 being of annular configuration having an outer diameter (OD) surface 634 dimensioned to be closely accommodated within the ID surface 622 of the first tool. The second tool has an inner diameter (ID) surface 632 sized to accommodate the lower end of the spout fitment (upper in this orientation). A lower rim portion 636 of the second tool engages the inwardly-protruding portion(s) of the projection(s) along the formerly outboard surface and rotates the cross-section of the projection(s) yet further. In this example, this rotation is what brings the cross-section over-center so that the projection(s) are now directed upward in the spout frame of reference (downward as shown). Thus, these two stages may occur sequentially as each fitment moves along associated portions of its travel around the station.

Figure 15:
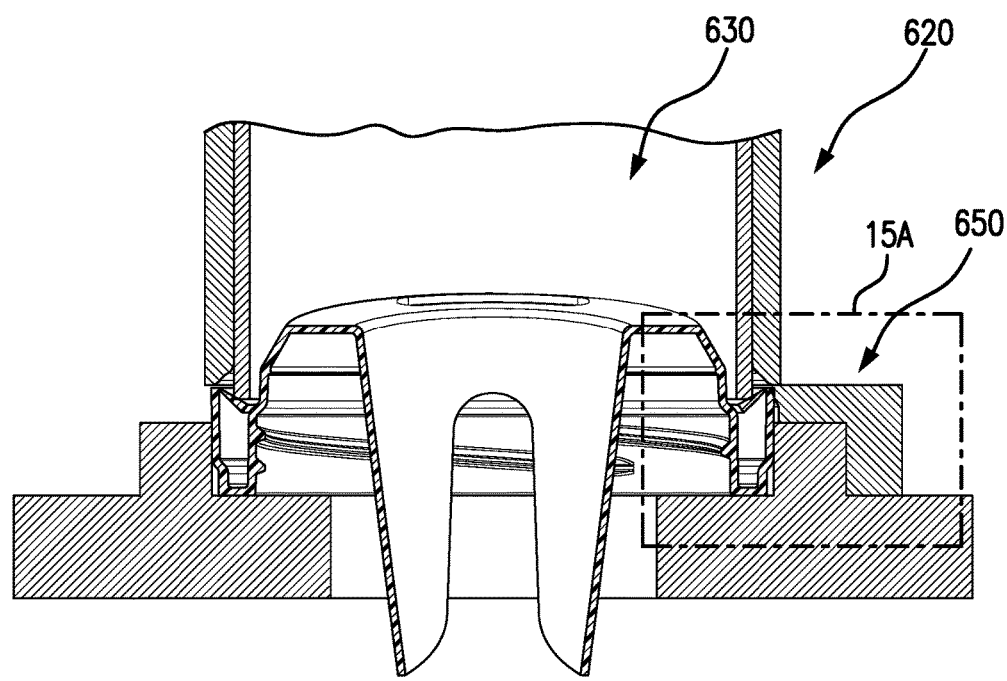
FIG. 15 is a partial central vertical sectional view of the spout fitment in a third stage of projection deformation.
Figure 15A:
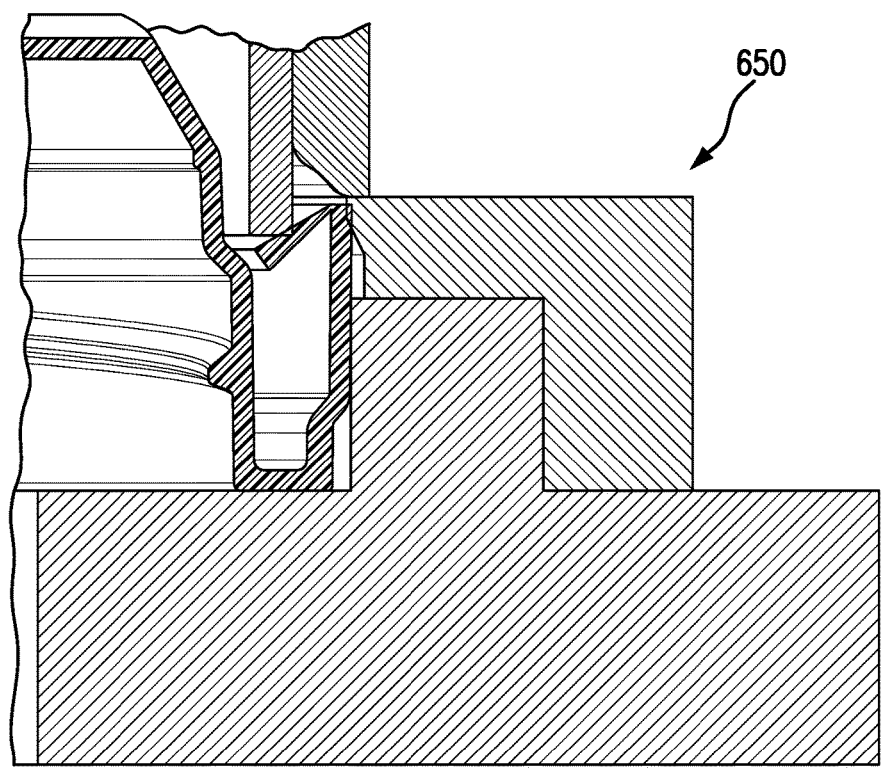
FIG. 15A is an enlarged view of a portion of the view of FIG. 15.
Figure 16:
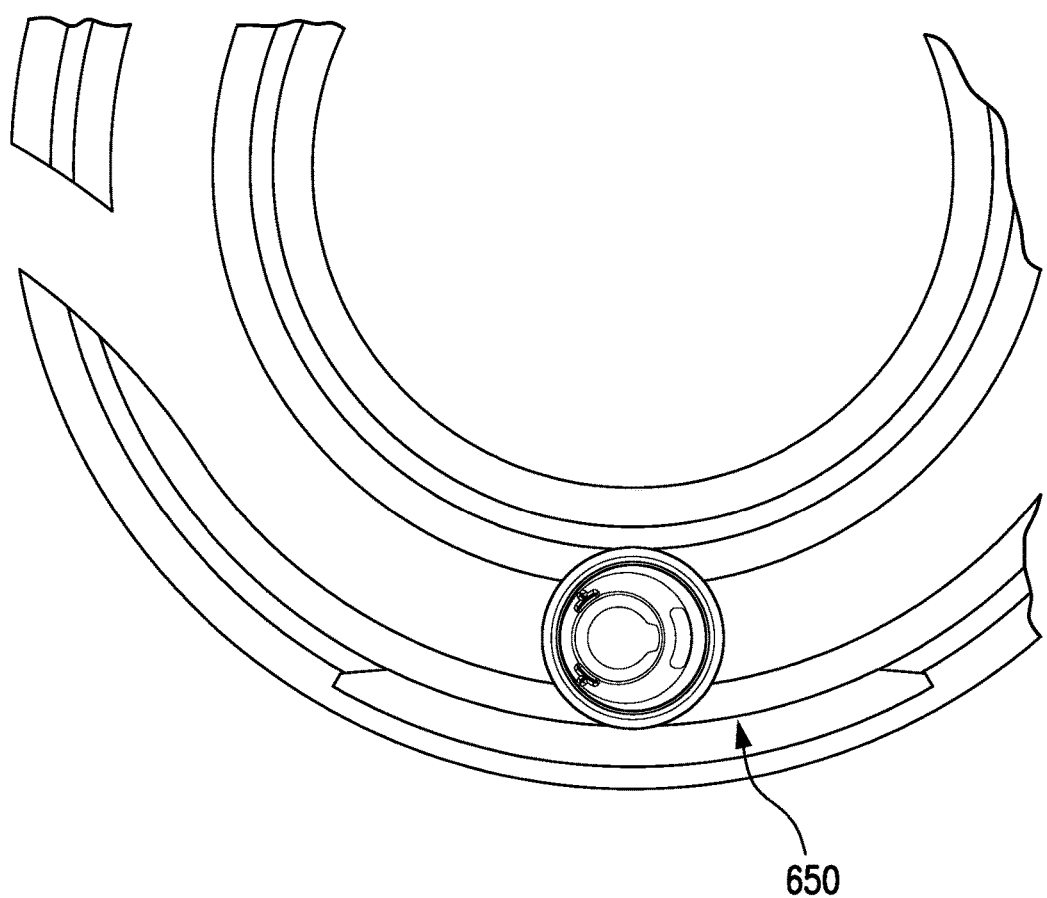
FIG. 16 is a partial schematic top view of a spout fitment processing station.
Figure 17:
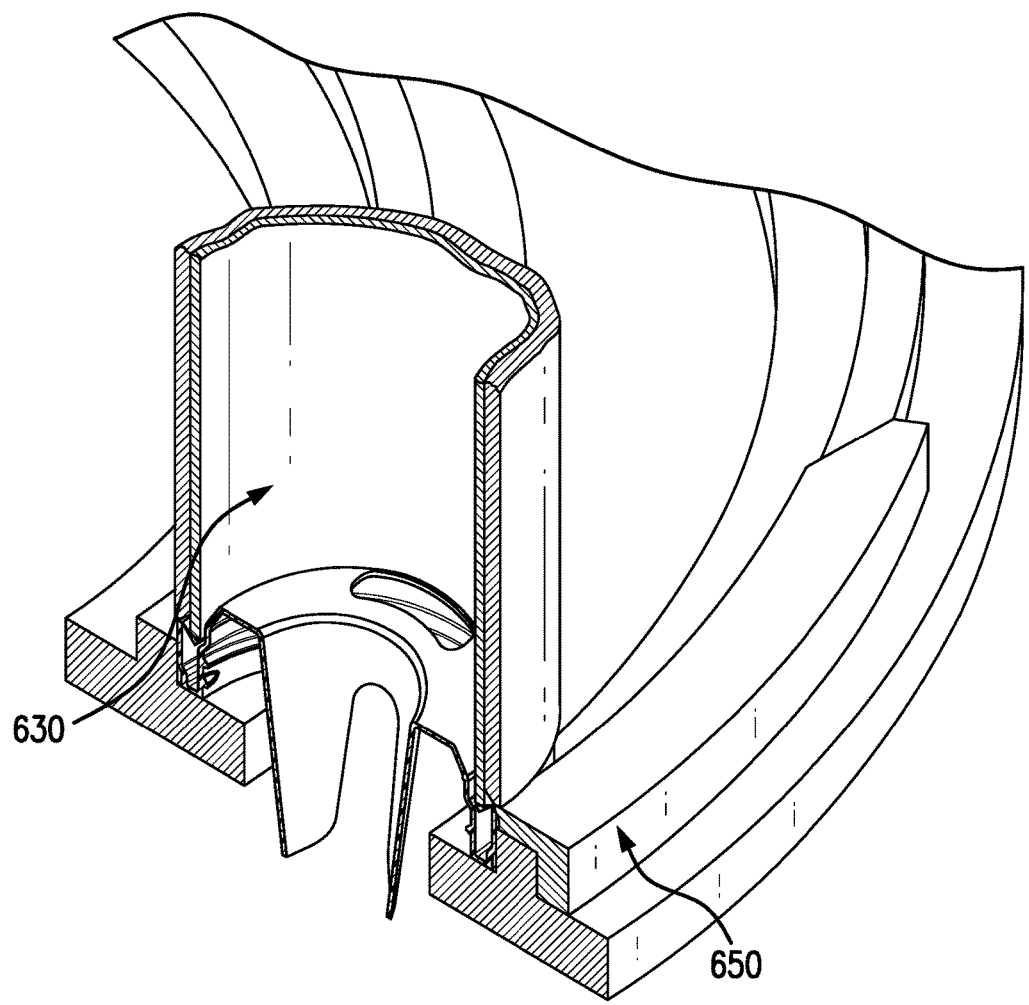
FIG. 17 is a partial cutaway view of the processing station of FIG. 16.
Figure 19:
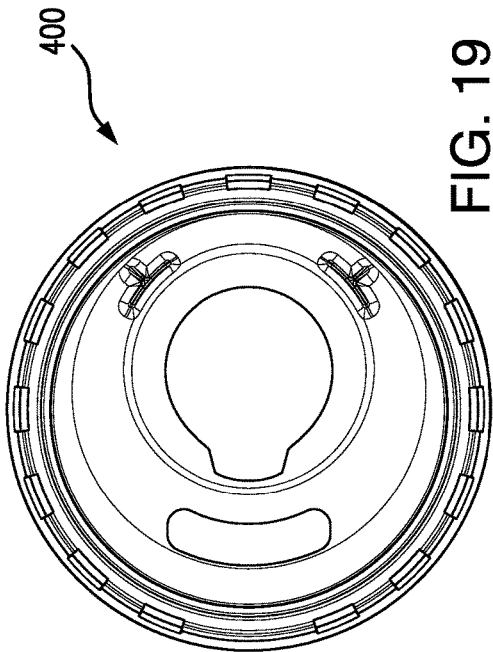
FIG. 19 is an as-molded bottom view of the fourth spout fitment.
Figure 21:
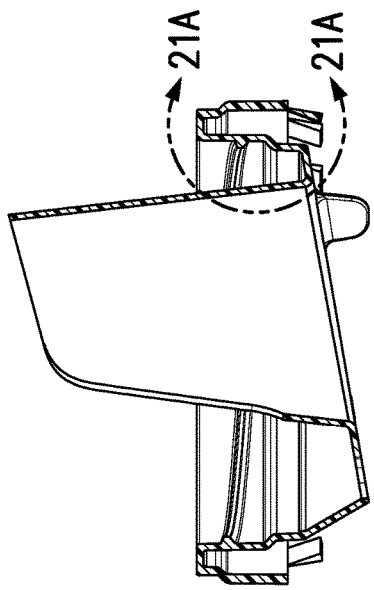
FIG. 21 is an as-molded central longitudinal/vertical sectional view of the fourth spout fitment taken along line 21-21 of FIG. 18.
Figure 18:
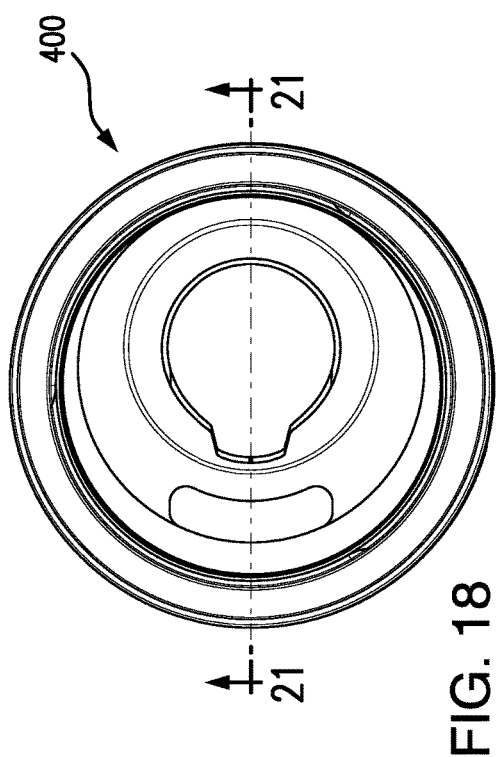
FIG. 18 is an as-molded top view of a fourth spout fitment.
Figure 20:
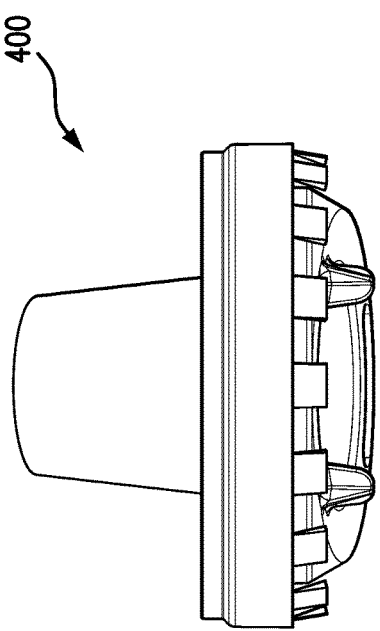
FIG. 20 is an as-molded front view of the fourth spout fitment.

As noted above, at least for the embodiments with a single projection or connecting webs, the tensile forces in the material may create a toggle action holding the projection(s) in this orientation. With discrete separated fingers, however, further processing may be required. FIG. 15 shows a swedging device 650 protruding in from the right side of the view. FIGS. 16 and 17 show the swedging along a sector of the station. The sector is long enough so that interaction between the device and the spout fitment may rotate the spout fitment 360° about its axis so that the swedging device ends up swedging a full 360° circumference (or whatever portion is occupied by projection(s)). FIG. 15A shows the swedging device pushing the outer sidewall in while the second tool 630 constrains inward movement of the projections. This creates a radial crushing of the hinge resulting in a plastic deformation to help maintain the inverted orientation of the projection(s).

Figure 25A:
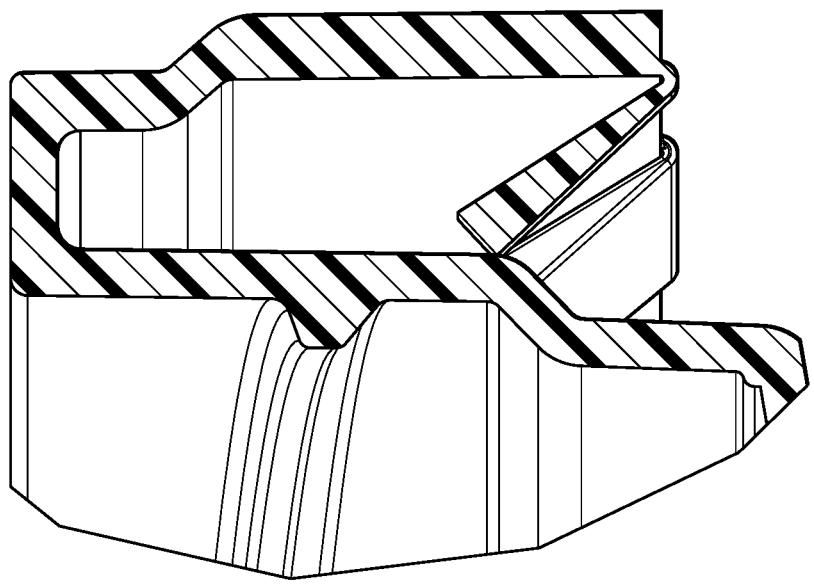
FIG. 25A is an enlarged view of a forward portion of the fourth spout fitment of FIG. 25.
Figure 21A:
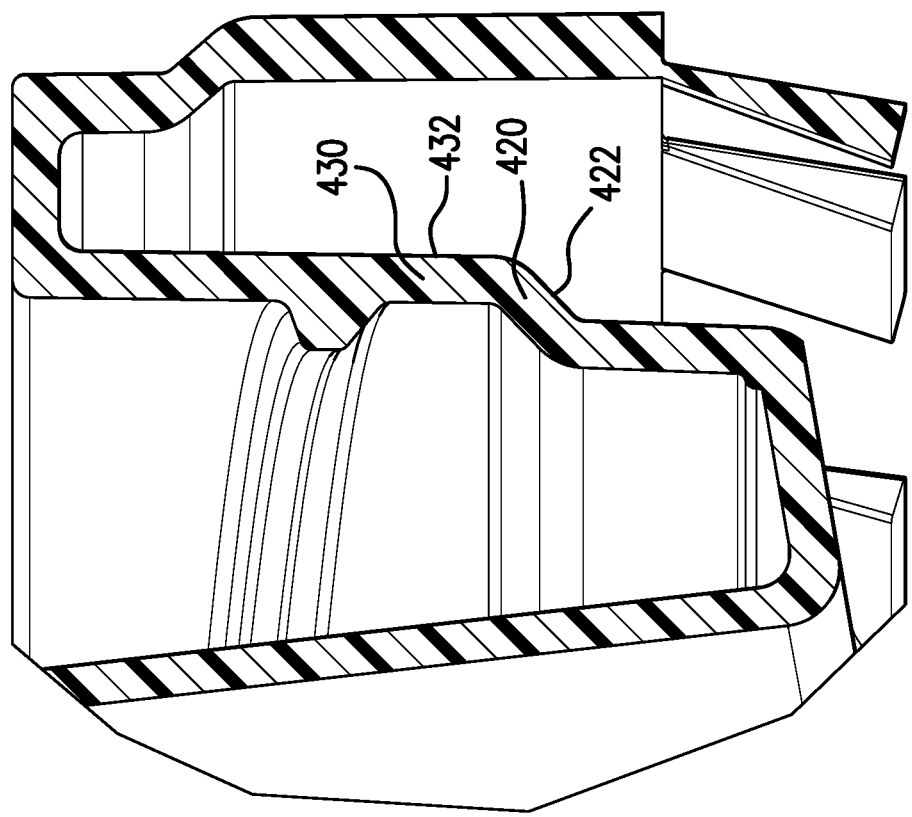
FIG. 21A is an enlarged view of a forward portion of the fourth spout fitment of FIG. 21.
Figure 23:
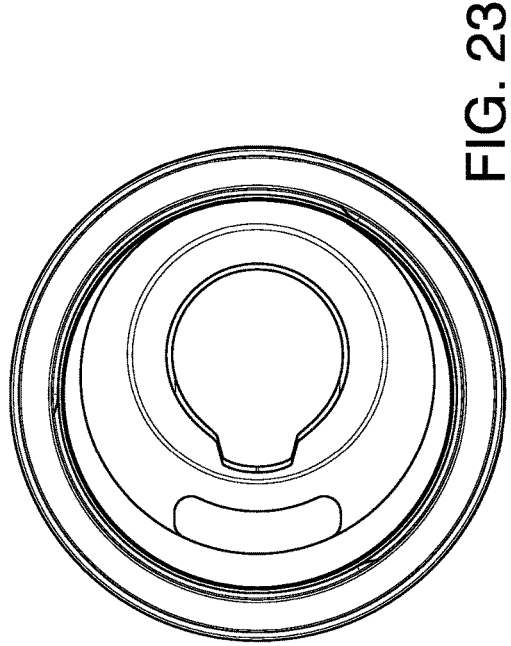
FIG. 23 is a bottom view of the fourth spout fitment in the first fingers-inverted condition.
Figure 25:
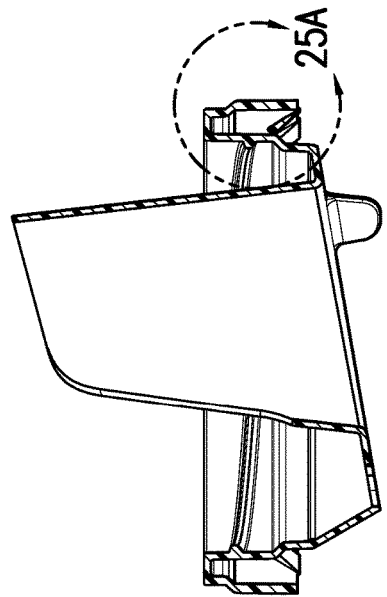
FIG. 25 is a central vertical/longitudinal sectional view of the fourth embodiment of the spout fitment taken along line 25-25 of FIG. 22.
Figure 22:
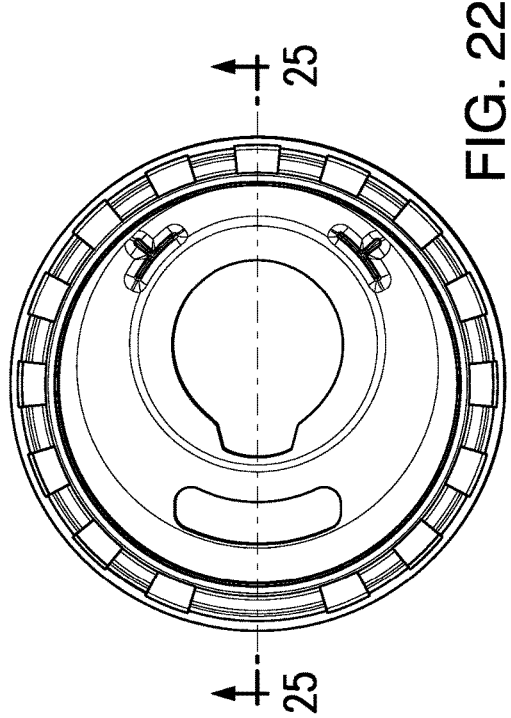
FIG. 22 is a top view of the fourth spout fitment in a first fingers-inverted condition.
Figure 24:
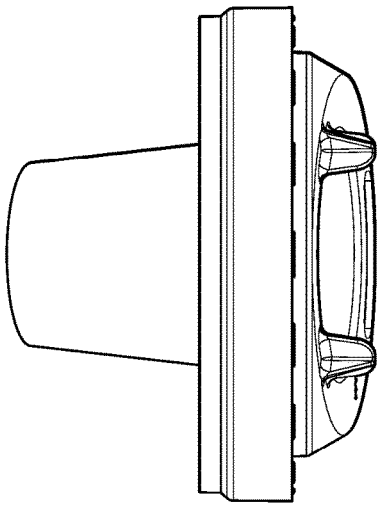
FIG. 24 is a front view of the fourth spout fitment in the first fingers-inverted condition.
Figure 26:
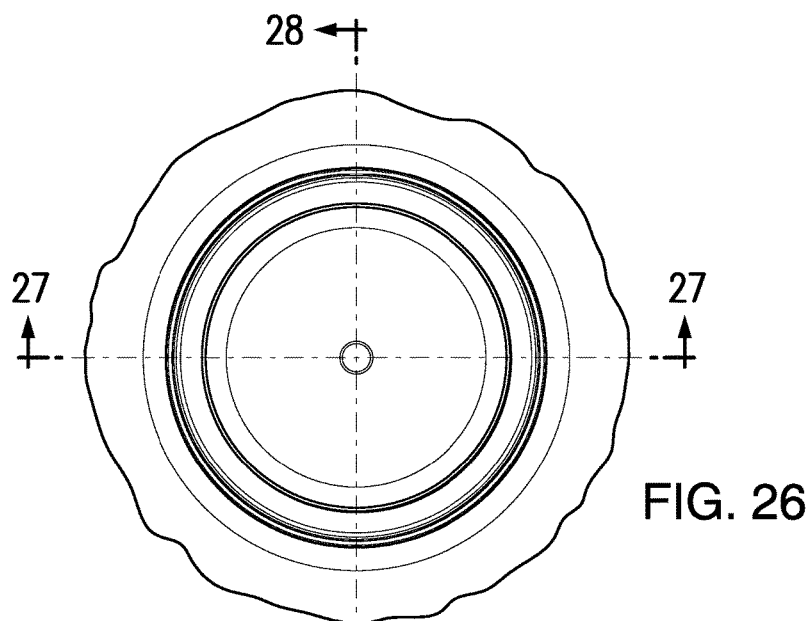
FIG. 26 is a partial top view of a bottle including the fourth spout fitment.
Figure 27:
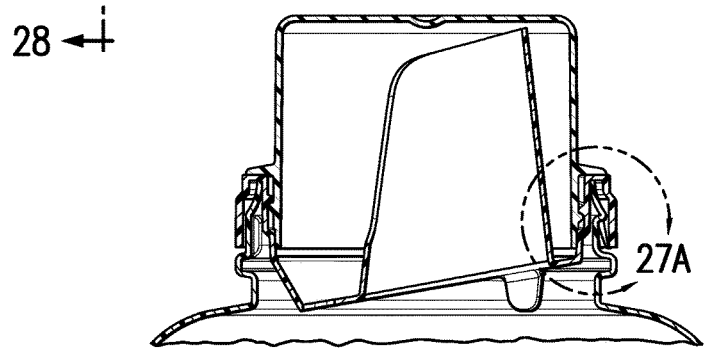
FIG. 27 is a central longitudinal/vertical sectional view of the bottle of FIG. 26 taken along line 27-27 of FIG. 26.
Figure 28:
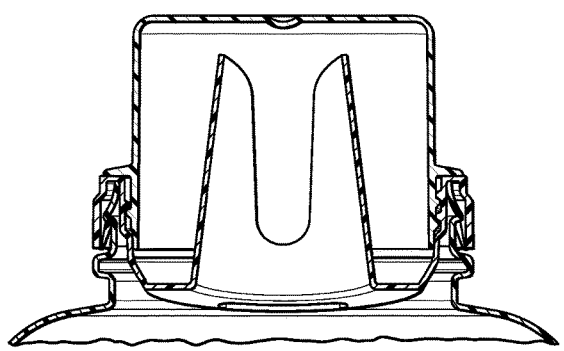
FIG. 28 is a transverse rearward vertical sectional view of the bottle of FIG. 26, taken along line 28-28 of FIG. 26.
Figure 27A:
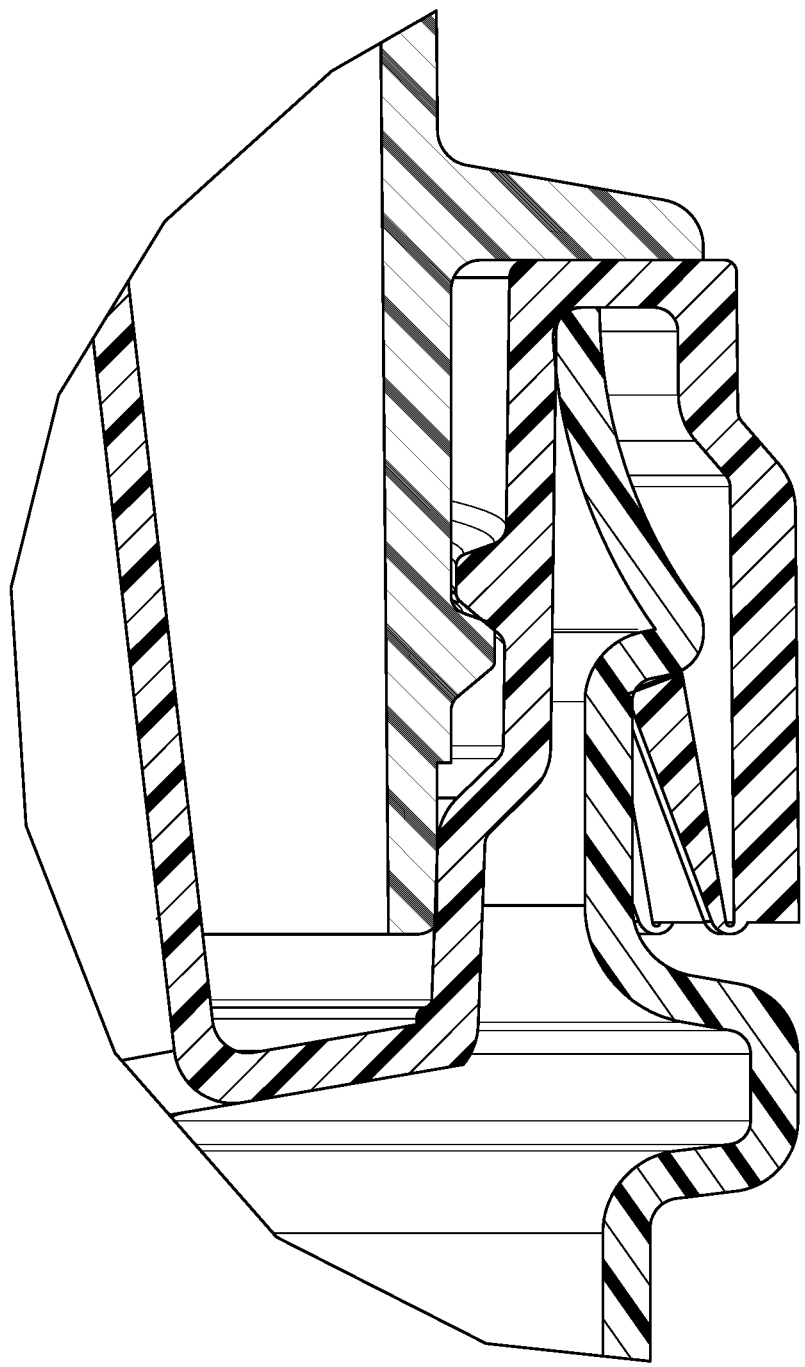
FIG. 27A is an enlarged view of a forward portion of the bottle of FIG. 27.
Figure 29:
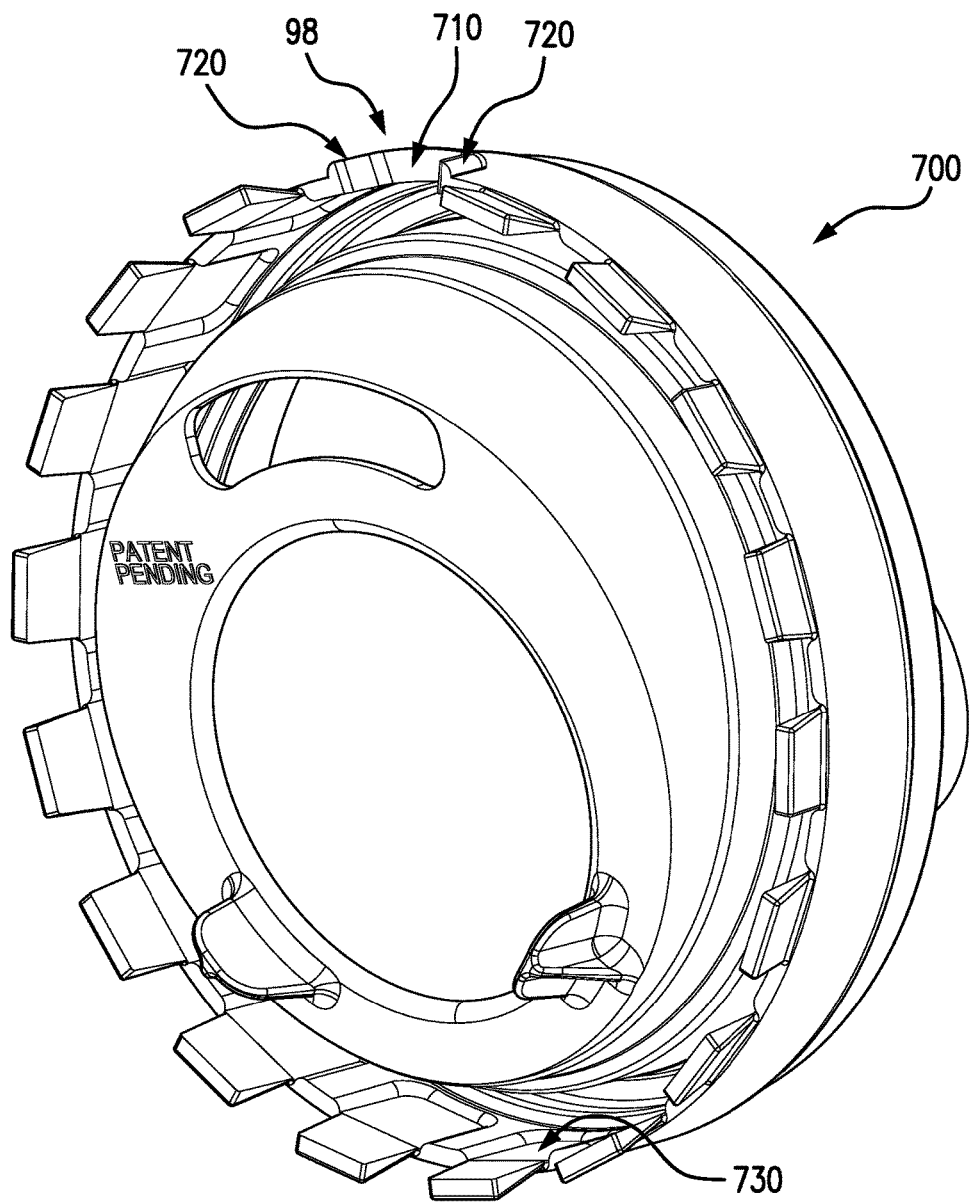
FIG. 29 is a bottom perspective view of a fifth spout fitment in an as-molded condition.
Figure 30:
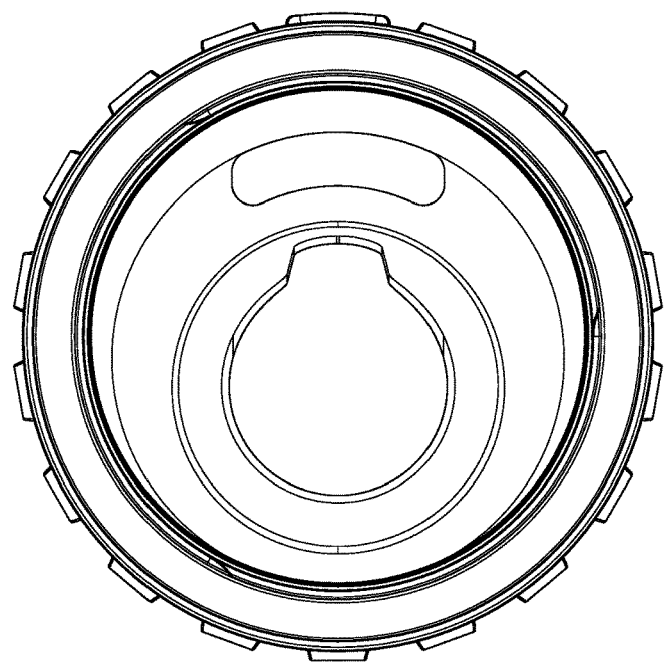
FIG. 30 is a top view of the fifth spout fitment.
Figure 31:
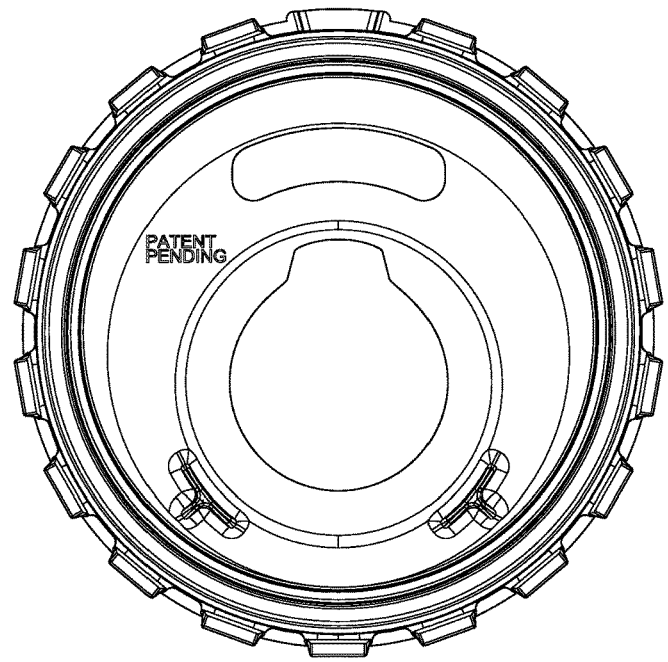
FIG. 31 is a bottom view of the fifth spout fitment.
Figure 32:
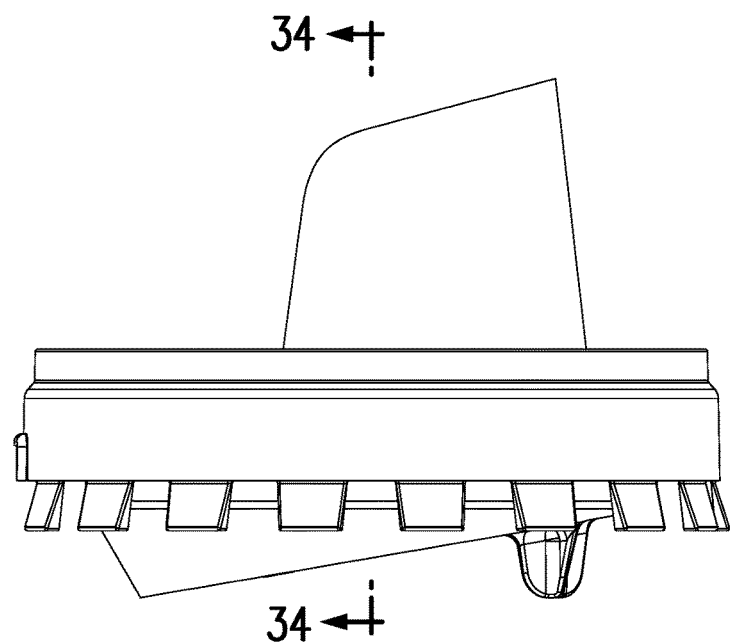
FIG. 32 is a right side view of the fifth spout fitment.
Figure 33:
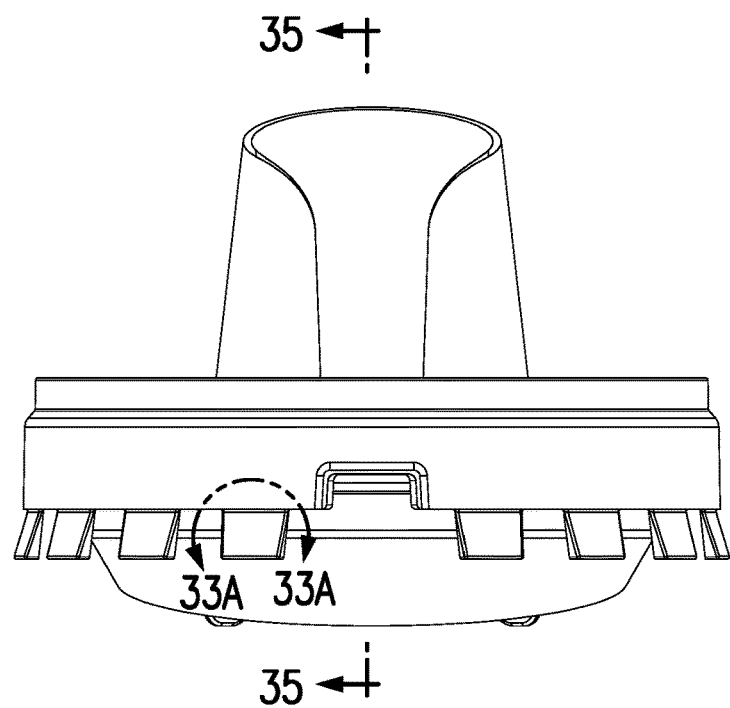
FIG. 33 is a rear view of the fifth spout fitment.
Figure 33A:
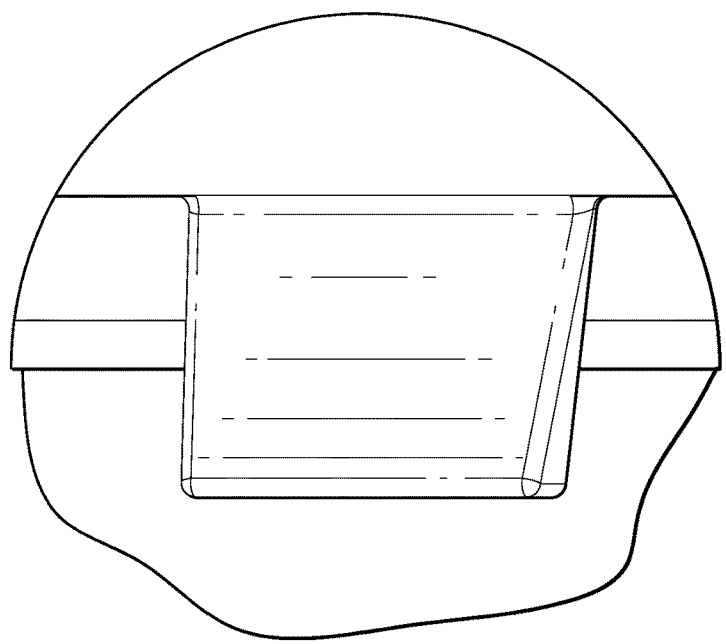
FIG. 33A is an enlarged view of a finger region of the spout fitment of FIG. 33.
Figure 35A:
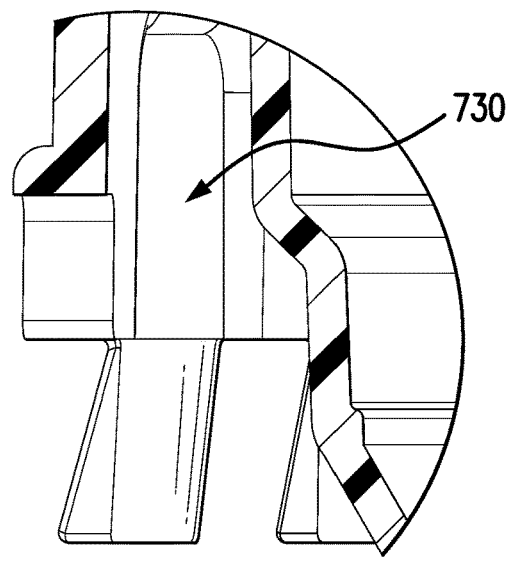
FIG. 35A is an enlarged view of the finger region of the fifth spout fitment taken along line 35A-35A of FIG. 35.
Figure 34:
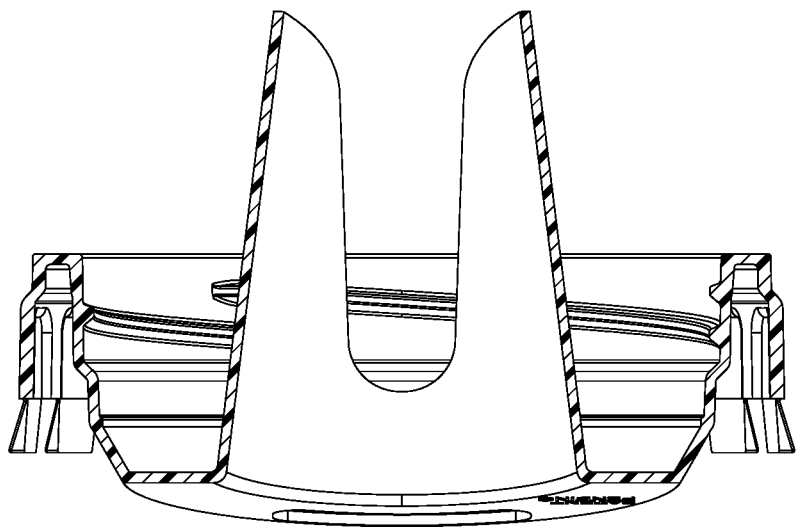
FIG. 34 is a transverse central vertical sectional view of the fifth spout fitment taken along line 34-34 of FIG. 32.
Figure 35:
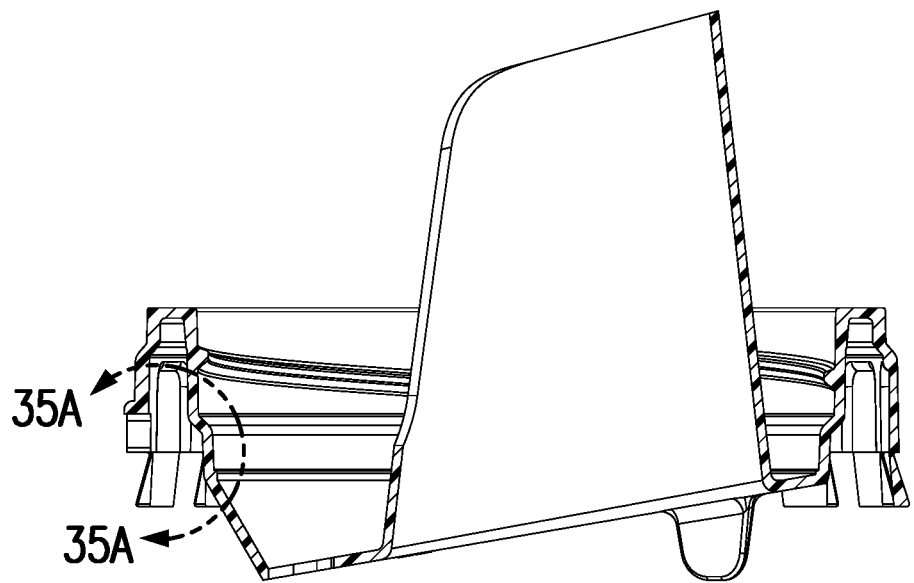
FIG. 35 is a central longitudinal vertical sectional view of the fifth spout fitment taken along line 35-35 of FIG. 33.
Figure 36:
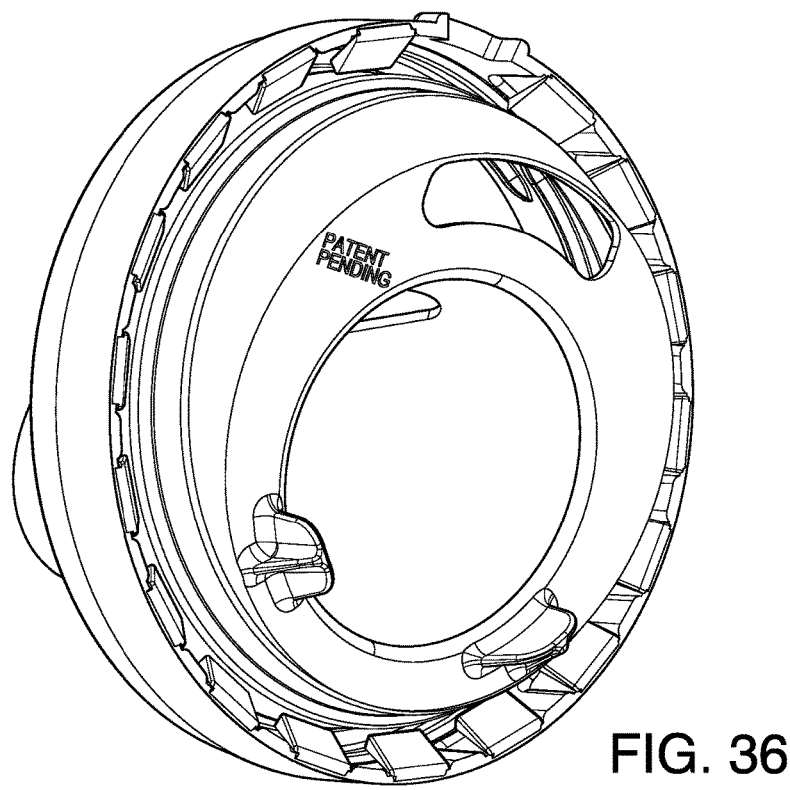
FIG. 36 is a bottom perspective view of the fifth spout fitment in a fingers-inverted condition.
Figure 37:
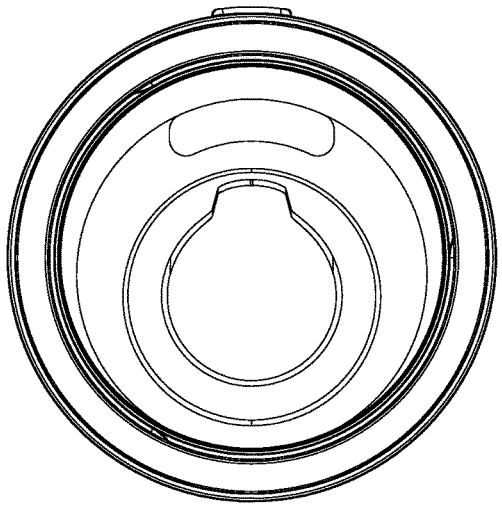
FIG. 37 is a top view of the fifth spout fitment in the fingers-inverted condition.
Figure 38:
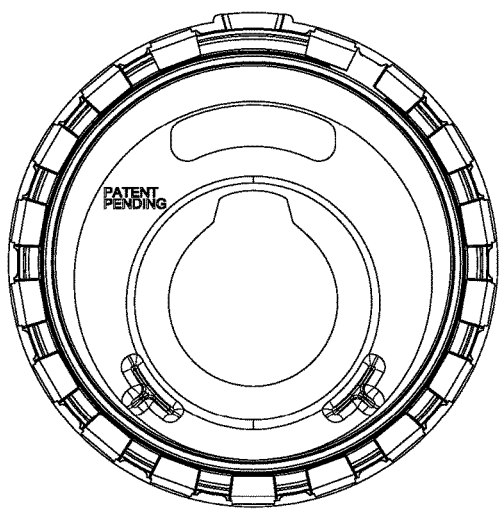
FIG. 38 is a bottom view of the fifth spout fitment in the fingers-inverted condition.
Figure 39:
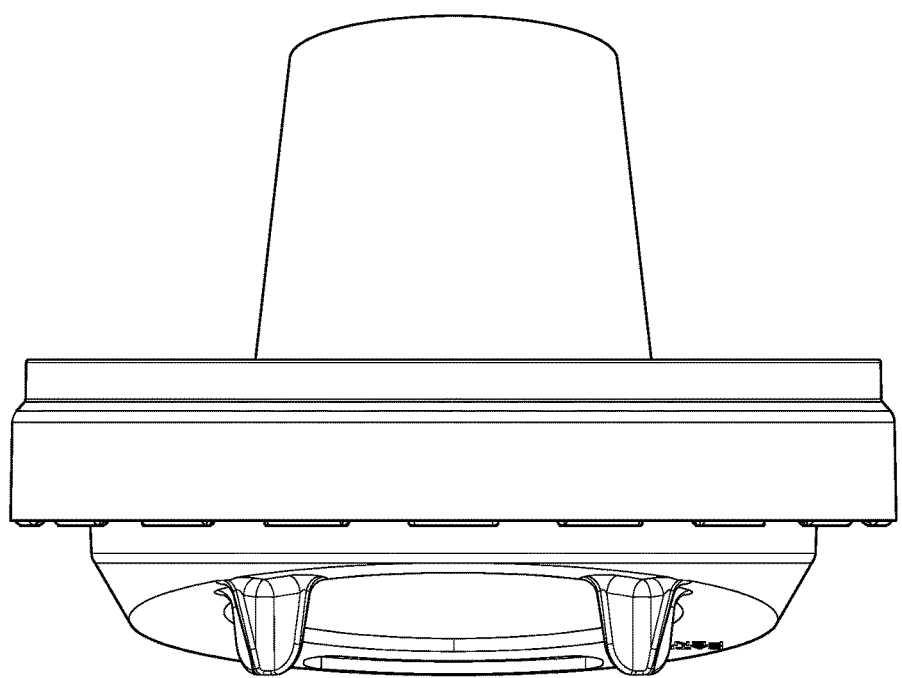
FIG. 39 is a front view of the fifth spout fitment in the fingers-inverted condition.
Figure 40:
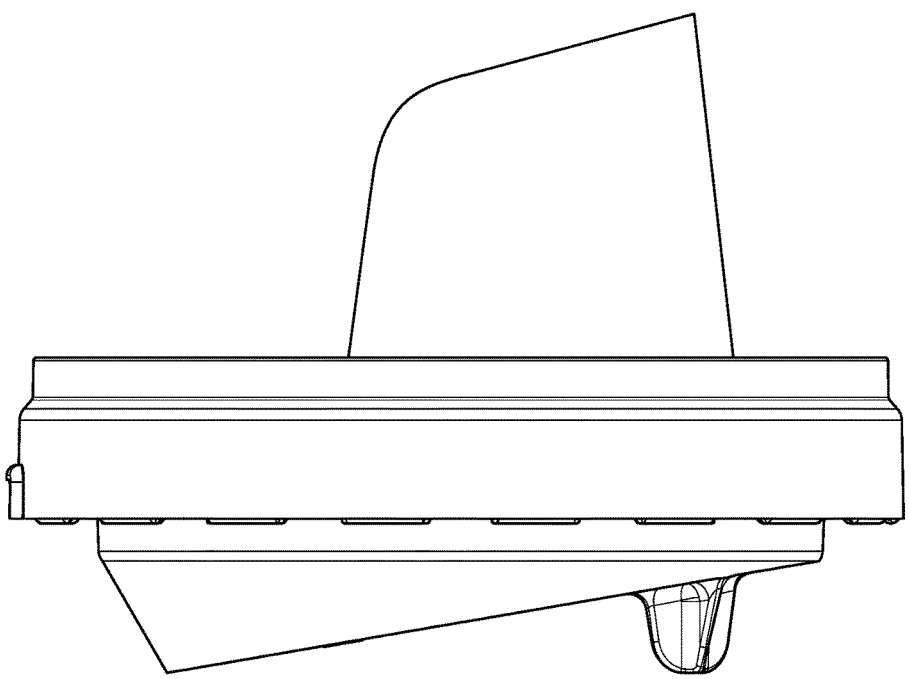
FIG. 40 is a right side view of the fifth spout fitment in the fingers-inverted condition.

A fourth embodiment is generally similar to the first embodiment but the dimensions and positioning of the fingers and the spout fitment 400 intermediate sidewall are chosen to allow elimination of the swedging station/operation. As the fingers are inverted from their initial as-molded FIG. 21A condition, they will come into contact with the outer surface of the intermediate wall. Via some combination of outward deformation of the outer sidewall or of the fingers themselves or of the intermediate sidewall, the fingers will pass through this contact. FIGS. 21A and 25A show the orientation of a jog 420 in the cross-section of the intermediate sidewall providing an outer surface portion 422 oriented to create an outward camming interaction with the tips of the fingers as they invert. This outward camming action may drive the outer sidewall outward. Thus, in this embodiment, at least a lower portion of the outer sidewall is not radially supported by a fixture during this process. However, once the fingers invert, their dimensions are such that they will be captured against a surface 432 of an upper portion 430 of the intermediate sidewall above the jog 420. The residual stress in the finger hinges will not be sufficient to outward flex the outer sidewall to allow the fingers to further descend. Thus, after this single step inversion, the spout fitment may be snapped into engagement with the bottle neck as described above.

Although this fourth embodiment is shown as a variation of the first embodiment, other variations of the other embodiments may function similarly.

FIGS. 29-35 show a fifth spout fitment 700 in an as-molded condition.

FIGS. 36-40 show the fifth spout fitment in a fingers-inverted condition.

Except as described below, other details of the fifth spout fitment, its manufacture, and its use with a container body and cap, may be as-described above for other embodiments. Various features shown for the spout fitment 700 may be implemented into other spout fitments independently of each other.

One difference is that there is a lug-receiving a recess 710 in the sidewall along the gap 98. The lug 100 (not shown) may be repositioned correspondingly. Along the perimeter of the recess, there may be a reinforcement 720 such as a radially-outwardly protruding buttress-like wall. This feature increases the effective surface to surface contact between spout fitment and lug. This reduces the chance of the spout cutting the bottle lug and the chance of the consumer from twisting the cap on past the lug point and removing the spout with the cap.

In an unillustrated alternative (but shown in U.S. Patent Application No. 62/191,371, filed Jul. 11, 2015, and entitled "Snap-Over Spout Fitment and Manufacture Methods") instead of the reinforced recess, the gap-facing sides of the two projections immediately adjacent the gap 98 are reinforced with radially outwardly protruding ribs (as molded; these ribs become radially inwardly protruding when the tabs are inverted). Thus, the ribs help maintain engagements with the bottle body lug for maintaining angular registry of the spout fitment when installed to the bottle body.

A second difference is that the outer sidewall inner surface has a plurality of recesses 730. Each recess has a pair of circumferential ends or sides and an upper end. For each tab, there is a respective associated said recess 730 immediately above the tab. This allows the fingers to flex partially into the recess when inverted so as to not over-stress the hinge. Stress reduction reduces the chance of failure and thus reduces the wastage (e.g., when initially bending, but more significantly when installing to the bottle body). Failure when installing may be more likely and is more significant due to loss of the bottle.

At a given radial separation between the inner diameter surface of the spout outer sidewall aside the recesses ("intact" surface) and the bottle body neck, the recesses may permit any of several dynamics. Two related dynamics are the reduced hinge stress and reduced required insertion/installation force. Another dynamic is to allow an increased radial thickness of the finger for improved retention. Trade-offs may be made amongst these properties. Thus, a lower radial separation may be provided relative to a fitment lacking the recesses without adversely affecting other properties.

Exemplary recess radial depth is 0.005 inch (0.13 mm) or greater, or 0.008 inch (0.20 mm) or greater, or 0.005 inch (0.13 mm) to 0.015 inch (0.38 mm) or 0.005 inch (0.13 mm) to 0.012 inch (0.30 mm) or 0.008 inch (0.20 mm) to 0.012 inch (0.30 mm). Exemplary sidewall intact thickness is 0.05 inch (1.3 mm) or 0.04 inch (1.0 mm) to 0.07 inch (1.8 mm).

Exemplary recess height is sufficient to accommodate the entire associated tab when fully folded (e.g., tab height or slightly greater). Shorter recesses are also possible.

Various implementations may have one or more of various advantages. One group of advantages relate to elimination of welding or adhering of the spout fitment to the bottle body. In addition to the economy of a saved step, this may facilitate delivery of the liquid before attaching the spout fitment to the bottle body which may allow more efficient processing (e.g., including higher flow delivery or less precisely aimed delivery through an opening in the bottle body larger than the spout opening). The spout fitments and caps may be delivered to the bottler as units and installed in units, thereby easing installation. Other potential advantages include weight reduction and reduced intrusion of the spout fitment into the bottle body (thereby permitting higher fill levels). Other potential advantages include improved sealing. Finally, there may be greater flexibility in aesthetics by permitting relatively easy use of differently-styled spout fitments with a given bottle body or differently styled bottle bodies with a given spout fitment.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments of the present invention have been described. Nevertheless, it will be understood that various modifications may be made without departing from the spirit and scope of the invention. For example, when implemented in the reengineering of an existing container configuration, details of the existing configuration may influence or dictate details of any particular implementation. Accordingly, other embodiments are within the scope of the following claims.

What is claimed is:

1. A container comprising:
   a body having a neck extending to a mouth defining a body opening;
   a spout fitment having:
      a spout within the body opening;
      an outer wall surrounding an upper portion of the neck; and
      an intermediate wall between the outer wall and the spout; and
   a cap having sidewall, an external thread of the cap sidewall engaged to an internal thread of the intermediate wall,
   wherein:
      the spout fitment has a plurality of projections extending mouthward from the outer wall in backlocked engagement with a surface of one or more features of the neck; and
      an inboard surface of the outer wall has a plurality of recesses, each respectively aligned with an associated one of the projections.

2. The container of claim 1 wherein:
   a gap in the plurality of projections receives a lug of the body to angularly register the spout fitment.

3. The container of claim 1 wherein:
   the one or more features is a single full annulus feature.

4. The container of claim 1 wherein:
   the one or more features is a protrusion from an outer surface of the neck having an associated recess in an inner surface of the neck.

5. The container of claim 1 wherein:
   the plurality of projections have a proximally tapering thickness from a distal end to a root end.

6. The container of claim 1 wherein:
   the plurality of projections are in a circumferential array.

7. The container of claim 6 wherein:
   the plurality of projections have a plurality of alternatingly interspersed gaps.

8. The container of claim 1 further comprising:
   means on the body and fitment for preventing relative rotation of the body and fitment about a central longitudinal axis of the opening.

9. The container of claim 1 wherein:
   the fitment is neither adhered nor welded to the body nor threadingly engaged to the body.

10. The container of claim 1 wherein:
    a cap sealing surface is along an underside of a flange of the cap.

11. A method comprising:
    molding a spout fitment having:
       a spout having an outlet;
       an intermediate wall outboard of the spout and cooperating with the spout to form a trough;
       an outer wall;
       a web joining the outer wall to the intermediate wall and cooperating with the intermediate wall and outer wall to define a channel; and
       at least one projection extending from the outer wall in a direction away from the web; and
    shifting the at least one projection to extend in a direction toward the web, wherein:
       after the shifting, the at least one projection relaxes into contact with an outer surface of the intermediate wall.

12. The method of claim 11 wherein the shifting comprises:
    a rotation by at least 45°; and
    the rotation involving a toggle action.

13. The method of claim 11 further comprising:
    inserting the spout fitment into a neck portion of a container body, the inserting comprising a resilient deformation of the at least one projection followed by an at least partial relaxation so as to engage a locking surface of the at least one projection to a locking surface of the container body to resist a reverse extraction; and
    threading a cap onto at least one of the spout fitment and container body.

14. The method of claim 13 wherein:
    the threading is at least partially before the inserting.

15. The method of claim 13 wherein:
    the inserting consists essentially of a linear insertion.

16. A method comprising:
    molding a spout fitment having:
       a spout having an outlet;
       an intermediate wall outboard of the spout and cooperating with the spout to form a trough;
       an outer wall;
       a web joining the outer wall to the intermediate wall and cooperating with the intermediate wall and outer wall to define a channel;
       a plurality of projections extending from the outer wall in a direction away from the web; and
       a plurality of recesses in an inboard surface of the outer wall, each respectively aligned with an associated one of the projections; and
    shifting the plurality of projections to extend in a direction toward the web.

17. The method of claim 16 wherein:
    during the shifting, the plurality of projections flex partially into the respective associated recess of the plurality of recesses.

18. The method of claim 16 further comprising:
    inserting the spout fitment into a neck portion of a container body, the inserting comprising a resilient deformation of the at least one projection followed by an at least partial relaxation so as to engage a locking surface of the at least one projection to a locking surface of the container body to resist a reverse extraction; and
    threading a cap onto at least one of the spout fitment and container body.

19. The method of claim 18 wherein:
    the threading is at least partially before the inserting.

* * * * *